US006839471B1

(12) United States Patent
Vogt, IV

(10) Patent No.: US 6,839,471 B1
(45) Date of Patent: Jan. 4, 2005

(54) EXTENDED DISCRETE FOURIER TRANSFORM AND PARAMETRIC IMAGE ALGORITHMS

(76) Inventor: Robert Vogt, IV, 3468 Richmond Ct., Ann Arbor, MI (US) 48105

( * ) Notice: Subject to any disclaimer, the term of this patent is extended or adjusted under 35 U.S.C. 154(b) by 0 days.

(21) Appl. No.: 09/544,961

(22) Filed: Apr. 7, 2000

Related U.S. Application Data

(60) Provisional application No. 60/128,395, filed on Apr. 8, 1999.

(51) Int. Cl.[7] ................................................ G06K 9/36
(52) U.S. Cl. ........................ 382/280; 342/196; 708/405
(58) Field of Search ................................ 382/280, 276, 382/284, 285, 289, 291, 299, 302, 260, 286, 297, 250; 708/403, 400, 402, 404–820; 342/194, 196; 324/309

(56) References Cited

U.S. PATENT DOCUMENTS

| | | | |
|---|---|---|---|
| 3,971,927 A | | 7/1976 | Speiser et al. ............... 235/186 |
| 4,581,715 A | | 4/1986 | Hyatt ......................... 364/726 |
| 4,817,015 A | | 3/1989 | Insana et al. ............... 364/507 |
| 4,929,954 A | | 5/1990 | Elleaume ..................... 342/194 |
| 4,973,111 A | | 11/1990 | Haacke et al. .............. 324/309 |
| 5,579,444 A | * | 11/1996 | Dalziel et al. ............... 700/259 |
| 5,684,889 A | | 11/1997 | Chen et al. .................. 382/128 |
| 5,740,284 A | * | 4/1998 | Wober et al. ................ 382/250 |
| 5,790,686 A | * | 8/1998 | Koc et al. .................... 382/107 |
| 5,872,538 A | * | 2/1999 | Fowler ........................ 342/194 |
| 6,288,542 B1 | * | 9/2001 | Proksa et al. ............... 324/307 |
| 6,341,179 B1 | * | 1/2002 | Stoyle et al. ............... 382/254 |

* cited by examiner

Primary Examiner—Bhavesh M. Mehta
Assistant Examiner—Seyed Azarian
(74) Attorney, Agent, or Firm—Gifford, Krass, Groh, Sprinkle, Anderson & Citkowski, PC

(57) ABSTRACT

Computation of the Extended Discrete Fourier Transform (XDFT) for N×N input data (corresponding to an N×N image) gives additional information about each point in the image. This additional information can be presented in the form of a polar plot of magnitude vs. phase. Parameters derived from this plot allow novel parametric images to be obtained, giving additional information beyond that obtained by a conventional Discrete Fourier Transform. The plots can be manipulated (e.g. smoothed), corresponding to a new method of image processing for this kind of data. Applications of this new method are as widespread as the use of conventional Fourier transform analysis. The analysis is more computationally intensive than the well-known Fast Fourier Transform algorithm, but the extra information obtained and image processing capabilities can more than compensate for this.

5 Claims, 38 Drawing Sheets

Program Structure

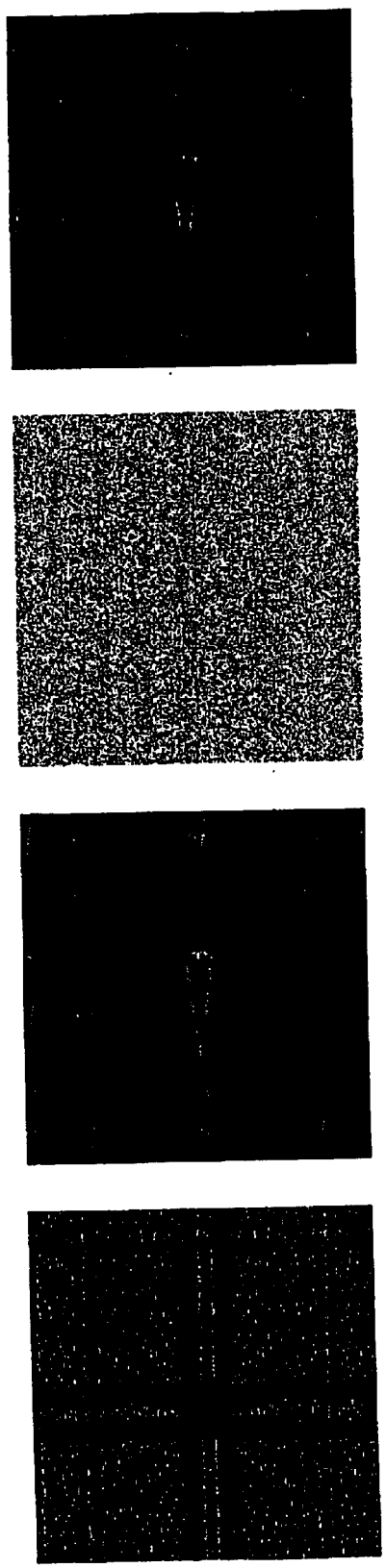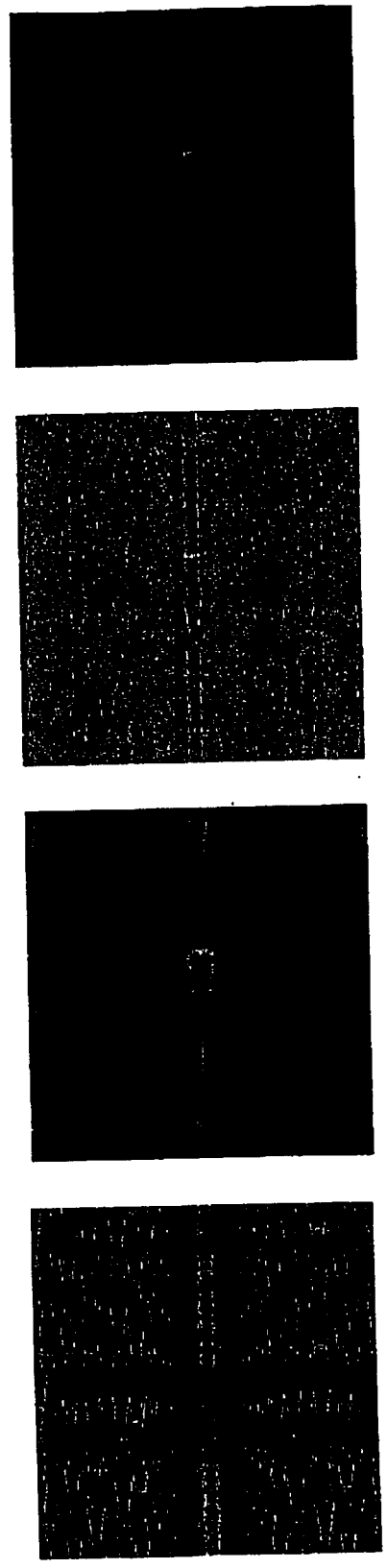
FIGURE 14A  FIGURE 14B  FIGURE 14C  FIGURE 14D

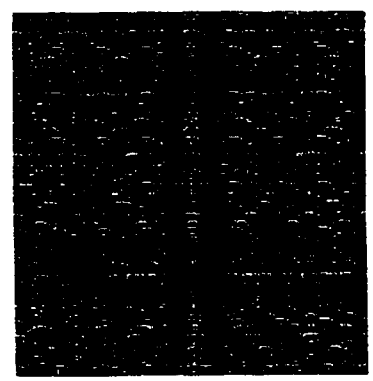
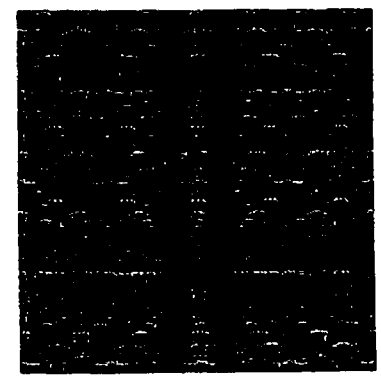
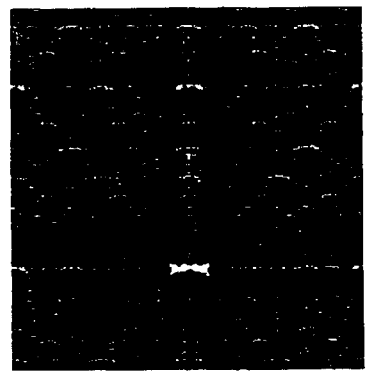
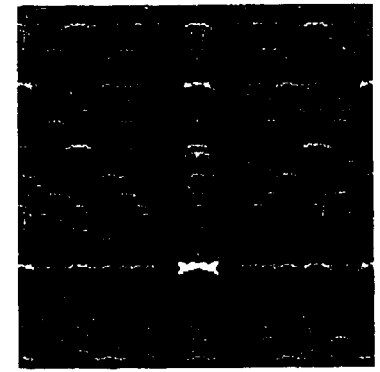
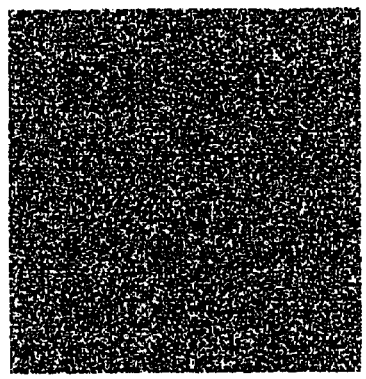
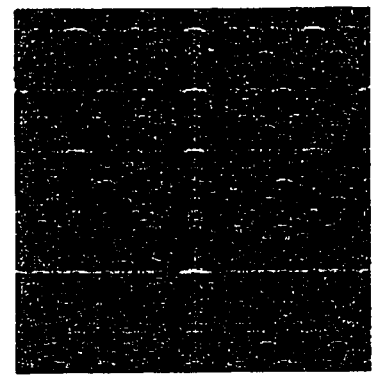
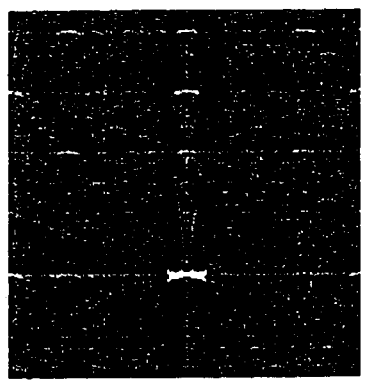
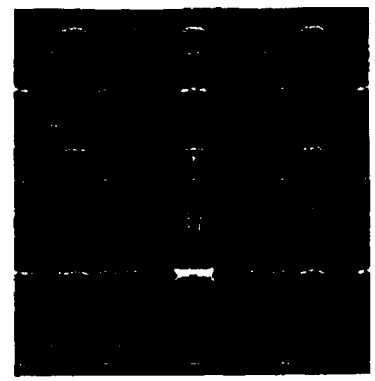
FIGURE 15A  FIGURE 15B  FIGURE 15C  FIGURE 15D

EXTENDED DISCRETE FOURIER TRANSFORM AND PARAMETRIC IMAGE ALGORITHMS

REFERENCE TO PRIOR APPLICATIONS

This application claims priority of U.S. provisional application Ser. No. 60/128,395, filed Apr. 8, 1999, the entire contents of which are incorporated herein by reference.

FIELD OF THE INVENTION

This invention relates generally to mathematical transformations and, in particular, to improvements in the discrete Fourier transform.

BACKGROUND OF THE INVENTION

The Fourier Transform (FT) is one of the most widely used algorithms in modem science and engineering. In fields such as radar, sonar, radio astronomy, X-ray crystallography, magnetic resonance imaging, tomography, and ultrasound, images can be formed directly by calculating the 2D Fourier Transform of collected signal data to provide a picture based on the reflections of waves transmitted at different frequencies.

The Fourier transform, and also its FFT (Fast Fourier Transform) and DFT (Discrete Fourier Transform) versions, can be used for a variety of purposes, in addition to formation of images. It can be used to reduce noise, to extract or enhance specific features of data, to analyze emission/absorption spectra of materials and distant stars, to describe scattering behavior in radar images, to provide compressed representations of data, to study radar returns (signatures) of stealth aircraft, process medical data (MRI and ultrasound), and to produce 3D terrain images. While the Fourier Transform is used to produce images, unless additional processing occurs (weighting, scaling, clipping, etc.) such images can be noisy and/or contain reverberation-like artifacts called "sidelobes."

The Fourier series makes it possible to transform the information in one domain (input data) to a different, but equivalent, domain (output image). The Fourier transform frequency, or output domain, contains the same information as the original function, which is in the time domain. The major problem in using the transform is computational, since it requires $N^2$ computations. The Fourier Transform only became widely used after the advent of modern computers and digital computing techniques. A key breakthrough came in 1965, when James Cooley and John Tukey published their algorithm that is now known as the Fast Fourier Transform (FFT). This algorithm requires only N logN calculations, compared to the $2N^2$ required by the Discrete Fourier Transform (DFT).

The Fast Fourier Transform makes use of symmetries present in the discrete transform calculation; it builds up the final results in stages, each twice as large as the previous one. The creation of the FFT led to an explosion of the FT in engineering applications. Now, the FFT is one of most widely used mathematical calculations in all of engineering and physics, and is used as a common computing benchmark for engineering applications. The DFT is used to form images for synthetic aperture radar, magnetic resonance imaging, sonar, ultrasound, tomography, X-ray crystallography, and different types of spectroscopy, among others.

SUMMARY OF THE INVENTION

This invention resides in a permutation of the Fourier transformation, called the extended DFT, or XDFT, which offers certain advantages in terms of information extraction and other properties. A key difference between the normal DFT, and the EDFT, is that it does not immediately add each complex element of the input data after it has been rotated by the frequency kernel. Instead, for each complex image point, it maintains a floating point array corresponding to the discrete phases of the DFT. Computation of the Extended Discrete Fourier Transform (XDFT) is more time consuming than the Fast Fourier Transform, requiring $N^2+N$ calculations as opposed to N logN calculations. It is the "bins" for each image point, and the resulting parametric data they contain, which make up the Extended DFT. The FFT obtains its speed partly through performing successive complex sums, which throw away information retained in the XDFT.

Broadly, a method of analyzing an input signal containing a plurality of data points, according to the invention using Fourier frequency kernels, includes the steps of applying a frequency kernel to the data points, calculating magnitude data as a function of phase for the data points after the frequency kernel has been applied, and deriving useful information from the input data based upon the result of the calculation. As one disclosed example, an algorithm may be used to calculate one or more parameters from the magnitude data, which may then be used in image formation. In such applications, the XDFT can be used to create sharper quality images for synthetic aperture radar, magnetic resonance angiography, and other fields of endeavor.

In a more robust embodiment, the calculation of the Extended Discrete Fourier Transform (XDFT) may comprise the following steps, certain of which may be optional depending upon the field of use:

(a) creation an array of N phase bins (for an N×N element input signal and corresponding image)

(b) rotation of an input point (a complex vector of an input signal) by an individual phase of a frequency kernel (c) determination of a phase and magnitude for the input point after rotation by the frequency kernel (d) storing the magnitude of the rotated input point in the respective phase bin, corresponding to the phase of the rotated input point (e) repetition of steps (b–d) for all input points, with addition of magnitudes contained within the same storage bin (f) analysis of the resulting magnitudes contained in each storage bin (g) manipulation of the magnitude data in each storage bin (e.g. smoothing of a polar plot of magnitude vs. phase), if advantageous (h) repetition of the above process for each frequency kernel (i) creation of parametric images using parameters determined from the above; and (j) creation of lower-noise or otherwise modified images, if advantageous.

Conversion of the magnitude-phase information obtained after the completion of step (e) into complex numbers, followed by complex addition, recovers the information obtained by a conventional complex Discrete Fourier Transform (DFT) analysis, which corresponds to a point in a conventional DFT image. One advantage of this invention lies in the extra information obtained from step (f), and also the image manipulation/processing possibilities allowed by step (g). The extra information may give valuable information about the scattering medium, scattering mechanism, or sensor characteristics. The image processing may allow low noise images to be produced, and may allow artifacts to be suppressed.

BRIEF DESCRIPTION OF THE DRAWINGS

FIGS. 14 and 15 show parametric radar images of the cone sphere;

DETAILED DESCRIPTION OF THE INVENTION

Figure 1:
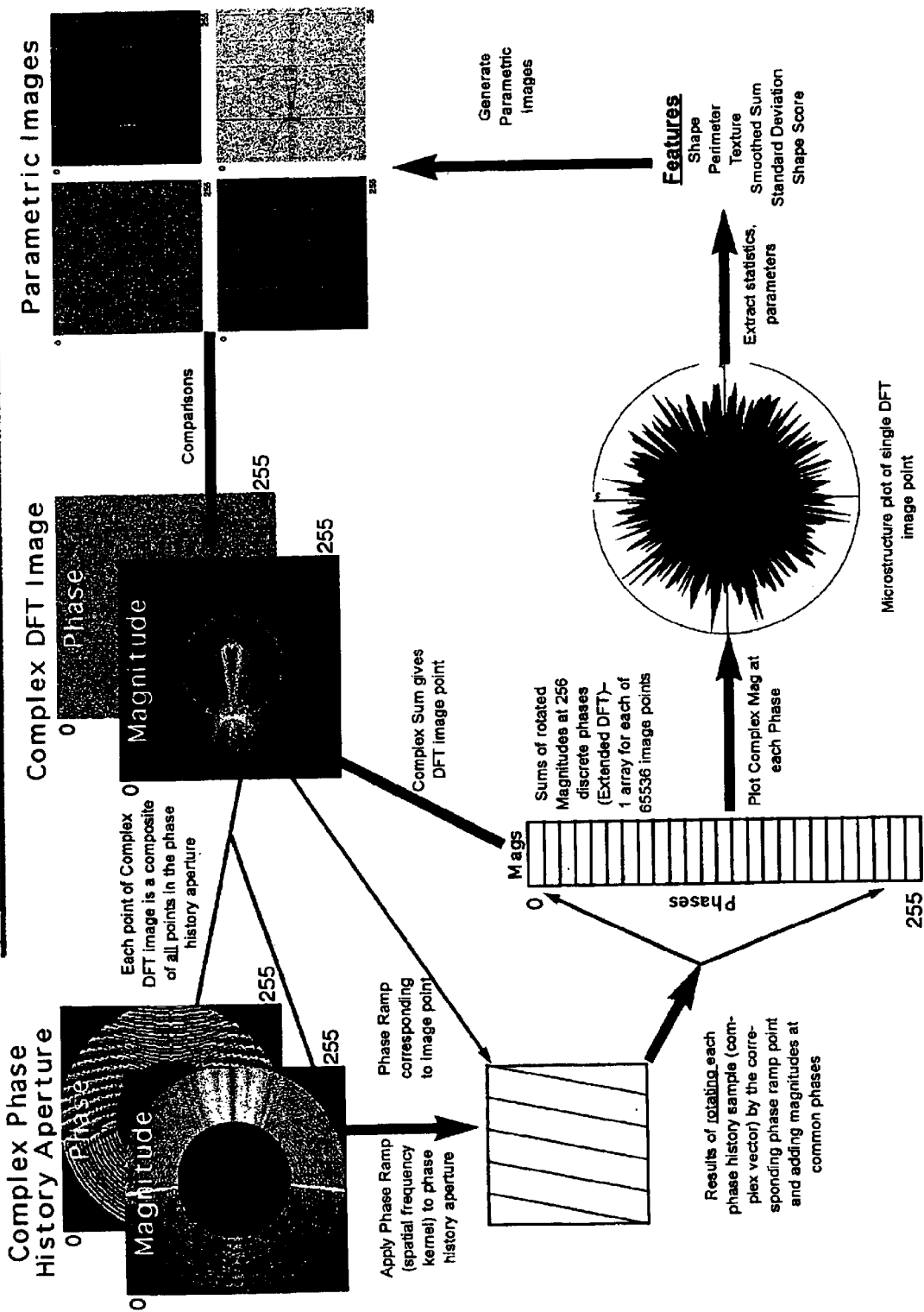
FIG. 1 is a schematic of the computational process used.

A key difference between the normal DFT, and the Extended DFT (or XDFT), is that it does not immediately add each complex element of the input data after it has been rotated by the frequency kernel. Instead, for each complex image point, it maintains a floating point array corresponding to the discrete phases of the DFT. For a 256×256-element signal and image, a 256 element floating point array is maintained which corresponds to the 256 discrete phases of the DFT. It is the "bins" for each image point, and the resulting parametric data they contain, which make up the Extended DFT. The computational steps are shown schematically in FIG. 1, and will be described in more detail in Example 7.

The FFT obtains its speed partly through performing successive complex sums, which throw away information retained in the XDFT. As described below, the XDFT provides more information than the DFT or FFT, precisely because it keeps the magnitudes which land at each different discrete phase separately, and then analyzes their relationships and patterns, rather than simply adding them up coherently. Computation of the Extended Discrete Fourier Transform (XDFT) is more time consuming than the Fast Fourier Transform, requiring $N^2+N$ calculations as opposed to $N \log N$ calculations.

For each image point, the standard DFT requires one sine and cosine multiplication for every point in the signal domain ($N^2$ for an N×N array), while the XDFT performs all phase calculations using modular arithmetic, and the magnitudes are added as real, not complex, numbers. Only if one wants to compute the complex sum is it necessary to perform N sine and cosine multiplications, one for each of the N individual phases. Because of this, the 1-D XDFT actually requires fewer calculations than the standard 1-D DFT ($N^2+2N$ vs. $2N^2$). Like the DFT, the XDFT can also can be calculated in parallel by having different processors, working independently, handle different points of the image. The increased speed, hard disk space, and RAM of modern computers makes the XDFT a feasible calculation for small datasets (on desktop or portable computers), and for larger datasets on supercomputers.

For complex-valued data, e.g. synthetic aperture radar (SAR) phase histories, the Discrete Fourier Transform has both real and imaginary components as inputs and outputs. Equations 1 and 2 below give the standard formulas for the real and imaginary outputs ($X_I(f)$ and $X_Q(f)$, respectively) based on a 1-D signal (a phaser) with real and imaginary input components $x_i(n)$ and $x_q(n)$, expressed in Cartesian coordinates; I and Q stand for the "in-phase" and "quadrature" parts of the radar signal). The position of points in the input signal are given by 'n' (=0 to N−1), and the positions of the output points, which also correspond to individual frequencies, are given by f (also 0 to N−1).

The following two equations, Equations 1 and 2, show that the complex DFT is calculated by multiplying real and imaginary signal components by sine and cosine waves of unit amplitude, but differing frequencies:

$$X_I(f) = \sum_{n=0}^{N-1} x_i(n) \cdot \cos\left(\frac{2\pi n f}{N}\right) + x_q(n) \cdot \sin\left(\frac{2\pi n f}{N}\right)$$

$$X_Q(f) = \sum_{n=0}^{N-1} x_q(n) \cdot \cos\left(\frac{2\pi n f}{N}\right) - \left(x_i(n) \cdot \sin\left(\frac{2\pi n f}{N}\right)\right)$$

In Equation 1, the real DFT output is the result of multiplying the real input values by cosine terms, and the imaginary input values by similar sine terms. Similarly, in Equation 2, the imaginary DFT output is the result of multiplying the imaginary input values by identical cosine terms, and the real input values by negated sine terms.

Considering the phase expressions in these formulas, ($2\pi n f/N$), the term ($2\pi/N$) divides a circle of $2\pi$ radians into N individual units (discrete phases). (For a signal with 256 points, there will be 256 phases and 256 output points). The small 'n' corresponds to a given sample of the signal, as well as to one of the N individual phase positions.

The frequency value f, when multiplied by n, causes the phase value to move around the circle at a rate determined by f, as n increases. For example, if f=1, then the sequence we get is n*1 or {0,1,2,3,etc.}. If f=2, we get {0,2,4,6,etc.}, and so on. Because the phases are circular, when the product, n*f is greater than N−1, we simply treat it as an integer modulo N, to obtain the resulting phase. One key feature is that for a Discrete Fourier Transform, since the phases are also discrete, they can be represented by modulo-N numbers, until they have to be converted to radians for taking the sine or cosine.

$$X_I(f) + jX_Q(f) = \sum_{n=0}^{N-1} [x_i(n) + jx_q(n)] \cdot \left[\cos\left(\frac{2\pi n f}{N}\right) - j\sin\left(\frac{2\pi n f}{N}\right)\right]$$

Equation 3—Combined Real and Imaginary Form of DFT

Figure 2:
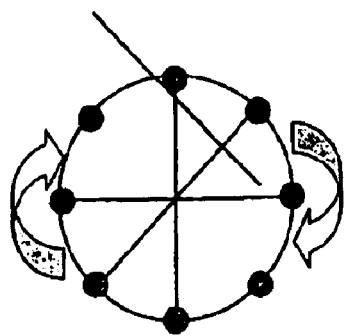
FIG. 2 illustrates the phase circle and rotational direction of the frequency kernel.

Equation 3 shows the combined real and imaginary form of the DFT, where j is the square root of (−1). Since the real and imaginary components are perpendicular to each other, we can add them in this way, and reduce the number of input terms. The combined cosine and sine term at the right, which is also known as the spatial frequency kernel, or Fourier kernel, can be thought of as a vector on a unit circle (radius 1), which rotates clockwise around as n increases, in a direction opposite to the normal positive phase direction (see FIG. 2). The $x_i(n)$ and $x_q(n)$ terms to the left represent a point in the complex plane corresponding to the signal at n. Multiplying this signal point by the unit circle point does not change its magnitude (its distance from the center at Complex [0,0]), since the unit circle magnitude is 1, but it will change its phase, rotating it in a negative direction, based on the values of n and f.

Equation 3 can be rewritten in terms of magnitudes and phases (polar coordinates), as shown in Equation 4. This equation demonstrates that the output magnitudes and phases of the DFT can be expressed in terms of the magnitudes and phases of the input signal. In this form, a magnitude component is considered to be a complex vector with a certain length, but with zero degrees of phase (the phase identity element). Likewise, a phase component has a given phase value, but a magnitude of one (the magnitude identity element). When we multiply a magnitude and a phase of this type together, we get back the magnitude of the first, and the phase of the second. Equation 4 shows that we can separate the magnitude and phase elements of both the inputs and the outputs of the DFT, and then multiply these together, using complex arithmetic, to obtain the final result.

$$X_{Mag}(f) \cdot X_{Phs}(f) = \sum_{n=0}^{N-1} x_{Mag}(n) \cdot \left(x_{Phs}(n) \cdot -\left(\frac{2\pi n f}{N}\right)\right)$$

Equation 4—Combined Magnitude & Phase Form of Complex DFT

On the right hand side of the equation, we can separate the magnitude of the signal from its phase, and combine this phase term with that of the sine and cosine terms (frequency kernel) of Equation 3. Since the magnitude of the spatial frequency kernel is 1, the kernel in fact reduces to nothing more than a negative phase term, $-(2 \pi n f/N)$, which simply rotates the phase of the signal in the negative direction, by a number of phase units (each $2\pi/N$ radians), equal to (n*f mod N). (This is because complex multiplication of phases is equivalent to adding them). The spatial frequency kernel can also be considered to be a phase ramp, with slope f. If the input phases themselves are also represented as individual values from 0 to N−1, then all of the phase rotation operations can be done in modulo N arithmetic, until it is necessary to take the complex sum of different terms, at which point sines and cosines are again needed to convert the polar values to Cartesian coordinates.

The Discrete Fourier Transform can be calculated by simply rotating the complex vectors of the signal by the individual phases of the frequency kernel, modulo N (without doing anything to the magnitudes), and then adding all of these complex results to obtain a single complex output point. For different output points in the Fourier domain, different frequency kernels (phase ramp slopes or speeds of rotation around the $2\pi/N$ circle) are used.

Figure 3:
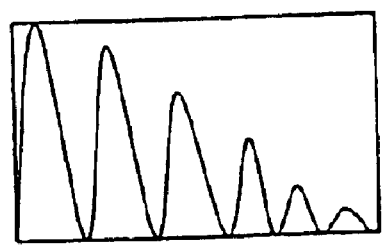
FIG. 3 shows a schematic of sidelobe artifacts.

For a signal with a single frequency (its phase rotates at a fixed rate), applying the kernel corresponding to this frequency will rotate all of the input phases back to a single phase value, and all of the magnitudes of the signal will add up directly, to give the maximum possible magnitude complex sum. This is how the DFT detects frequencies in the signal; it rotates the phases backwards by the exact rate required to make the complex vectors line up, adding up to a high value. When other kernels are applied to a signal with a different frequency, the magnitudes will be more spread around the circle, and will mostly cancel out when added. They will cancel out best at exact multiples of the original frequency. When they do not cancel out completely, we get coherent noise. Likewise, sidelobe artifacts occur (illustrated in FIG. 3) when the magnitudes are more heavily distributed on one side of the circle than the other is, which can occur in-between two multiples with a very strong frequency.

For 2-D signals (used to form 2-D images), the situation is almost the same as with the 1-D case. In the 2-D case, the frequency kernel can be thought of as a 2-D sloped ramp, where the X-slope may be different from the Y-slope. Each 2-D point in the image now corresponds to one of the N×N possible two-dimensional frequencies. In this case, all of the points in the N×N 2-D signal must have their phases rotated by the related ramp point before being added to produce the complex output value for that one image point. The 2-D equations follow.

$$X_I(f_r, f_c) + jX_Q(f_r, f_c) =$$
$$\sum_{r=0}^{N-1}\sum_{c=0}^{N-1} [x_i(r, c) + jx_q(r, c)] \cdot \left[\cos\left(\frac{2\pi}{N} \cdot (r \cdot f_r + c \cdot f_c)\right) - j\sin\left(\frac{2\pi}{N} \cdot (r \cdot f_c + c \cdot f_c)\right)\right]$$

Equation 5—Combined Real and Imaginary Form of 2-D DFT $$X_{Mag}(f_r, f_c) \cdot X_{Phs}(f_r, f_c) =$$
$$\sum_{r=0}^{N-1}\sum_{c=0}^{N-1} X_{Mag}(r, c) \cdot \left[X_{Phs}(r, c) \cdot \left(\frac{2\pi}{N}(r \cdot f_r + c \cdot f_c)\right)\right]$$

Equation 6—Combined Magnitude & Phase Form of 2-D Complex DFT

In the case of the XDFT, for e.g. the case of 256×256 data points, when the phase of an input point is rotated (modulo 256) by a given spatial frequency kernel or phase ramp corresponding to a particular image point, its final location is determined in terms of the 256 individual phases, then its magnitude is added to that phase bin. The process is continued in the same way for all of the points in the phase history (input data). At the end of this process, we have magnitude sums in each of the 256 bins. This is illustrated in the following code snippet, where x and y are dimensions of the phase history data, r and c are the row and column of the FT point being calculated, phmag is the magnitude of the [x,y] phase history (signal) point, imgphs is the kernel-rotated, modular phase, and phsmags is the array used to accumulate the rotated magnitudes in the 256 phase bins of the XDFT:

```
for (int y = 0; y < 256; y++) {
for (int x = 0; x < 256; x++) {
    if (phmag[y][x] > pow(10,-6)) { /* Ignore if near 0.0 */
        imgphase = (y * r + x * c) % 256;
        phsmags[imgphase] += phmag[y][x];
}}}
```

When these values are converted to complex numbers and added, the sum will exactly equal the value of the complex DFT at that image point. However, instead of adding these values directly, we plot the magnitude values at each of the 256 discrete phases, and then analyze the characteristics of this plot. The information in the plots—the statistics and the parameters that can be derived from each of them—provides the additional information about each image point, beyond the simple complex sum given by the standard DFT. By calculating such parameters on each plot that is associated with every single point in the image domain, we can create parametric images that display this information.

EXAMPLES

Computer programs were written to show how the XDFT works for simple cases. In each of the following Examples 1 to 6 the input data had 16 points. Each of these test cases had one or two frequencies in it, each having constant magnitude. One program generates the 16 element complex signals, a second was used to illustrate the effect of applying 16 different frequency kernels to this signal, and a third illustrates the XDFT plot, which results from adding the magnitudes which land at the same individual phase value, after being rotated by the frequency kernel.

Example 1

The signal has a constant magnitude of one and a constant phase of zero (corresponding to a frequency of 0). This signal appears in the first square in the upper left corner of FIG. 4A. Phases are plotted from bottom to top in red (dark gray in b/w copy) (0–15 discrete values), and magnitudes are plotted from bottom to top in green (light gray in b/w copy) (0 to the maximum value). The 16 plots on the left side of the figure illustrate the effects of the 16 frequency kernels on the original signal. Since the first kernel (0), has all zero phases, it is the identity kernel, having no effect on the original signal. Thus, we can always find the original signal in the upper left corner plot. The other 15 XDFT plots in FIG. 4 show what happens to this signal when the other frequency kernels (−1, −2 . . . −15) are applied. In this case, since the signal has constant magnitude of one and constant phase of zero, these plots actually illustrate the frequency kernels themselves, and how they interact with the original signal. The application of the kernel has no effect on the magnitude of the signal, only on the phases, as we see here. The constant zero phases of the signal in this example are rotated by different amounts (mod 16) as we apply the different kernels.

Figure 4B:
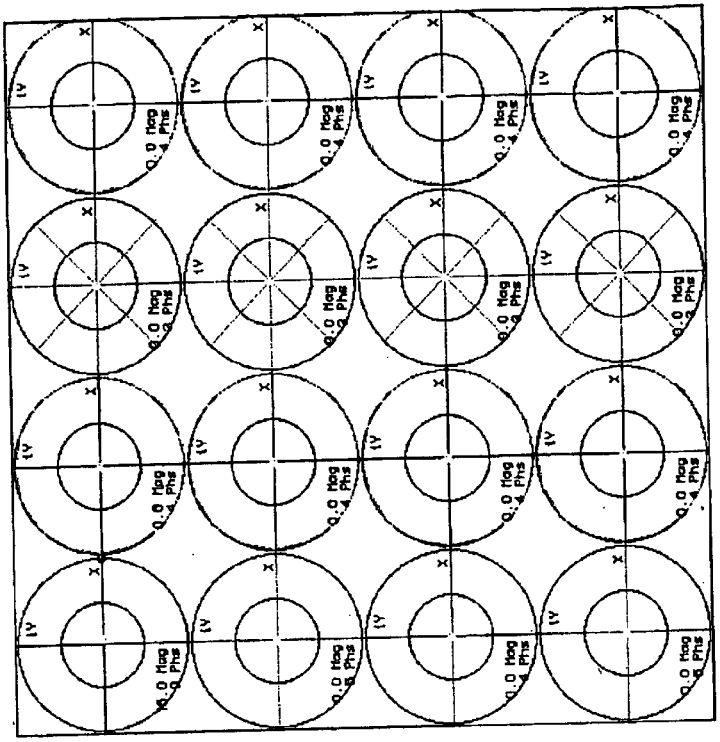
FIGS. 4-9 illustrate the XDFT concept, as described in Examples 1-6.
Figure 4A:
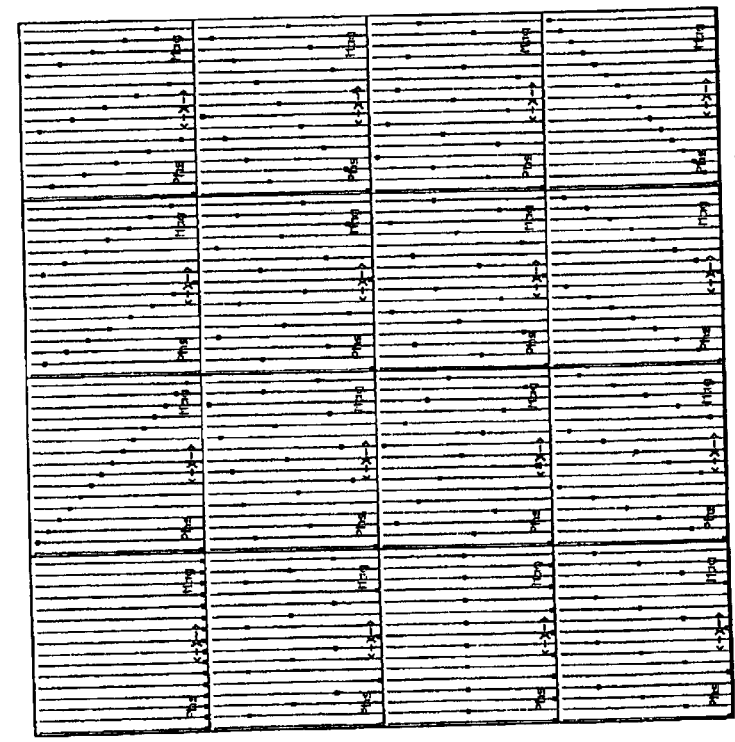

FIG. 4 also shows what happens when we compute the XDFT and its associated polar plots. For each frequency-modified signal plot in FIG. 4A, the corresponding plot in FIG. 4B is the result of adding the magnitudes of all rotated points which "land" at the same individual phase, and then plotting the resulting 16 magnitude sums at their corresponding phases. The magnitudes are shown in green, and plotted as a polygon; the complex average is shown in blue, and the complex sum is shown in red (hidden by the average if both are zero). In the cases where all of the XDFT magnitudes are equal, the magnitude plot is shown as a 16-sided polygon, which is difficult to distinguish from the outer black circle representing the maximum magnitude radius. The Magnitude and Phase text values at the bottom of each plot are the values for the complex sum.

In this example, the original signal has constant phase, so the first plot shows all of the magnitudes adding up at zero phase, with all of the other magnitudes equal to zero. When the −1 frequency kernel is applied, the constant magnitudes are distributed equally around the circle. For frequency (−) 2, the energy lands at 8 individual phases, and this is identical to what happens for frequencies 6, 10 and 14. At frequencies 4 and 12, the magnitude energy is distributed to 4 phase locations (0, 4, 8, and 12), while at frequency 8, everything is at either phase 0 or phase 8. All of the other frequencies distribute the constant phases and magnitudes uniformly around the circle. In these cases, the complex sum magnitude is zero. These plots illustrate the direct effect of the frequency kernels in the XDFT plot domain.

Example 2

Figure 5B:
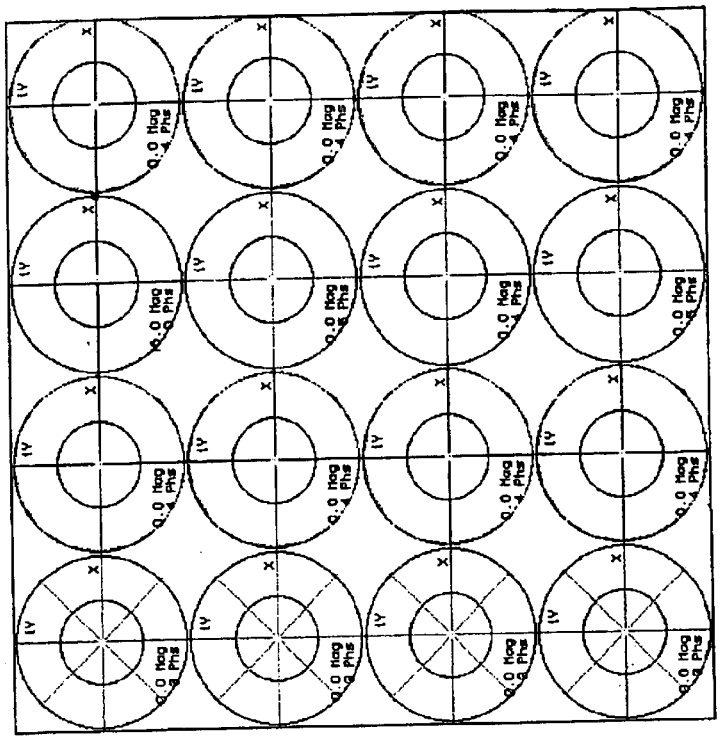
Figure 5A:
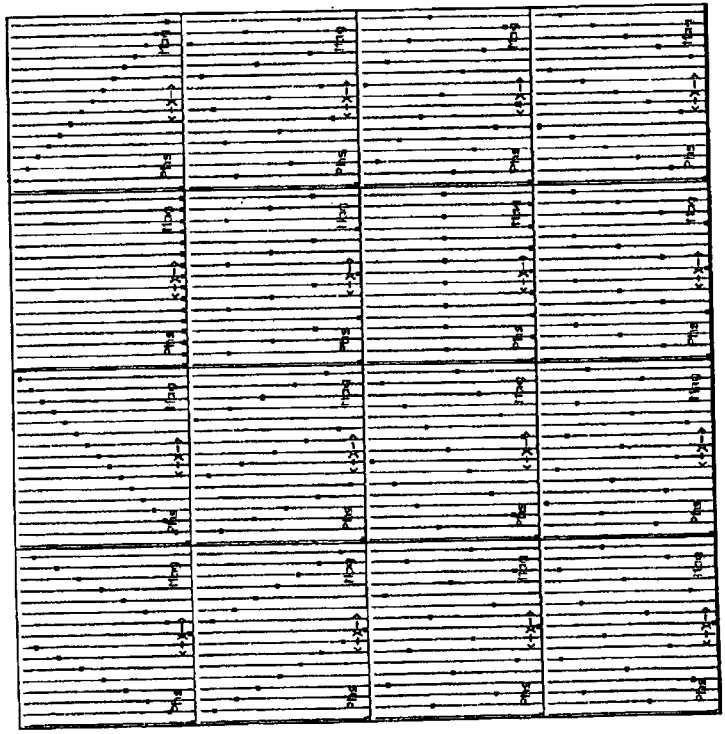

The complex signal has a single frequency of 2 and a magnitude of 1. We see this plotted in the upper left corner of the plots of FIG. 5A. The phases of the signal shift by +2 at every successive position. When we apply the −2 frequency kernel to this signal (two plot squares to the right) all of the original phases are rotated back to zero, and all of the magnitudes will sum together at zero phase. The other 15 plots show the effects of the other kernels on the frequency 2 signal or phaser. In fact, these plots look just like those of Example 1, except that they are shifted by two positions in sequence. If we look at the polar plots of FIG. 5B, we again see the same patterns in the XDFT plots as before, but the positions are shifted by two positions. In fact, for any single frequency signal, we would obtain similar signal and XDFT plots as what we see here, but shifted to different positions.

Example 3

Figure 6B:
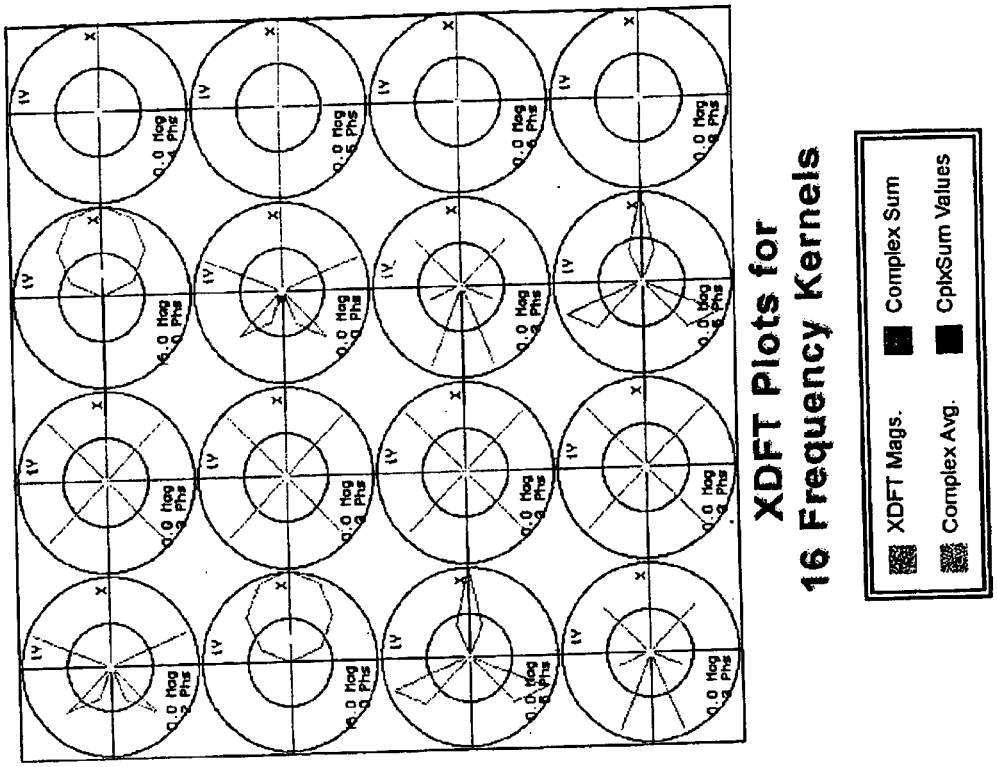
Figure 6A:
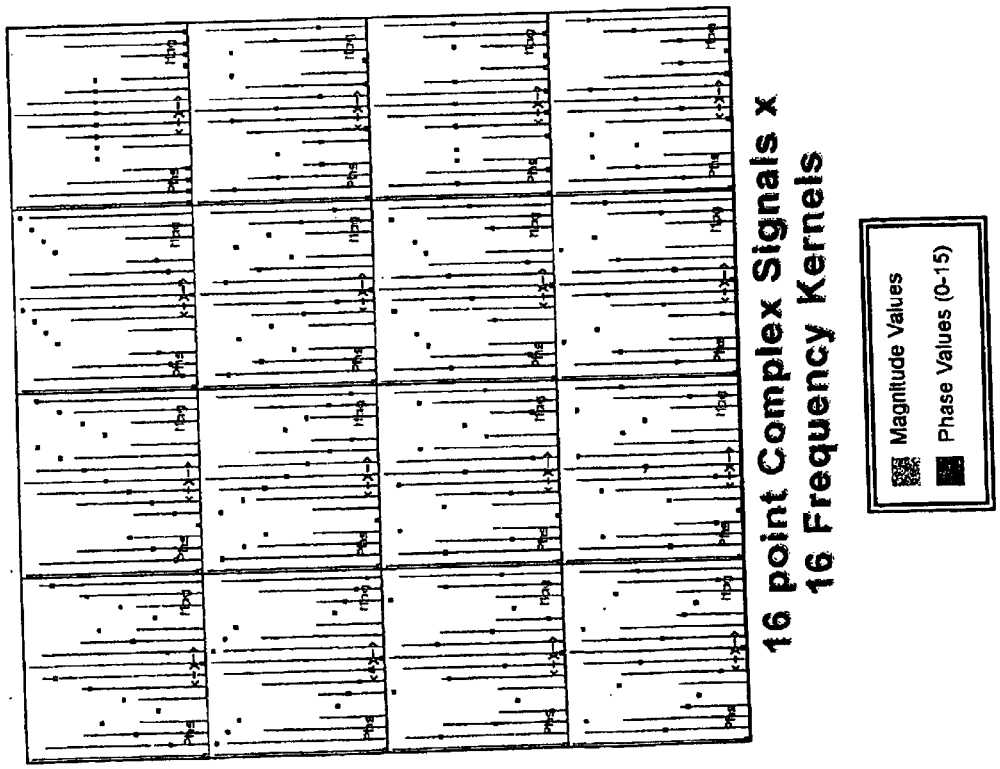

We have two frequencies of identical magnitudes added together (the frequencies are 2 and 4). When these two components are added together coherently, the resulting magnitudes are varied, forming two peaks (4−2=2). Note that in FIG. 6A, at frequencies 2 and 4, the resulting phase values are lined up with the magnitude peaks. In FIG. 6B, the polar plots show that at these two frequencies, the magnitudes are all rotated around to one side, forming offset octagons, and producing large sums. At the other frequencies, different patterns are produced, but they are all symmetric and cancel out when added.

Example 4

Figure 7B:
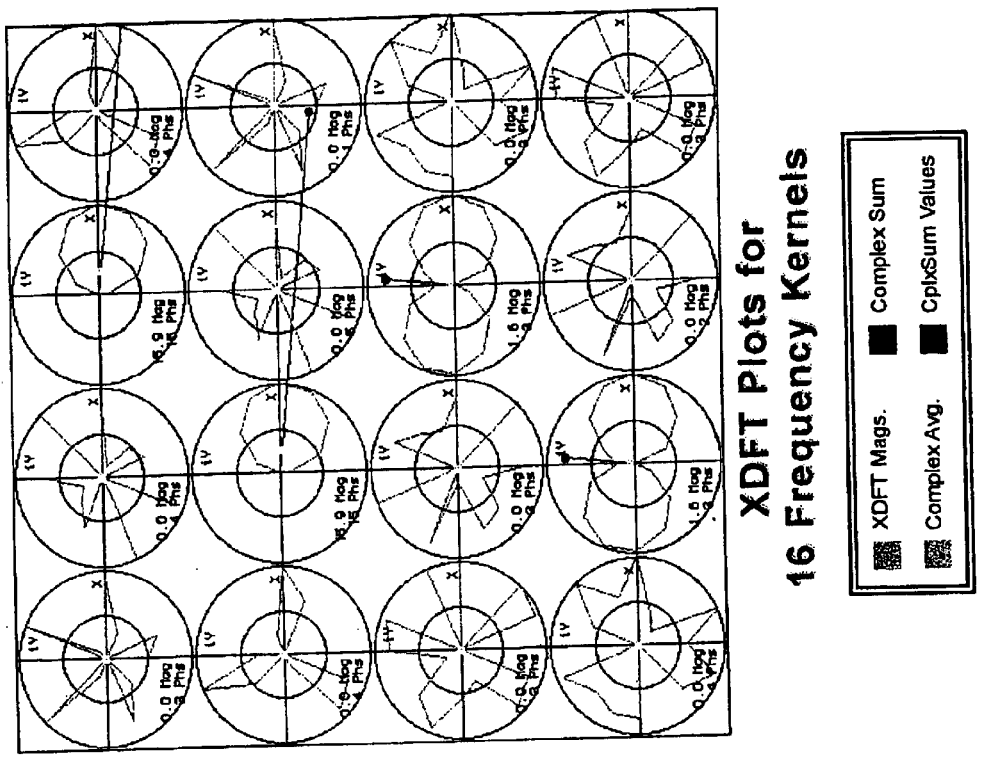
Figure 7A:
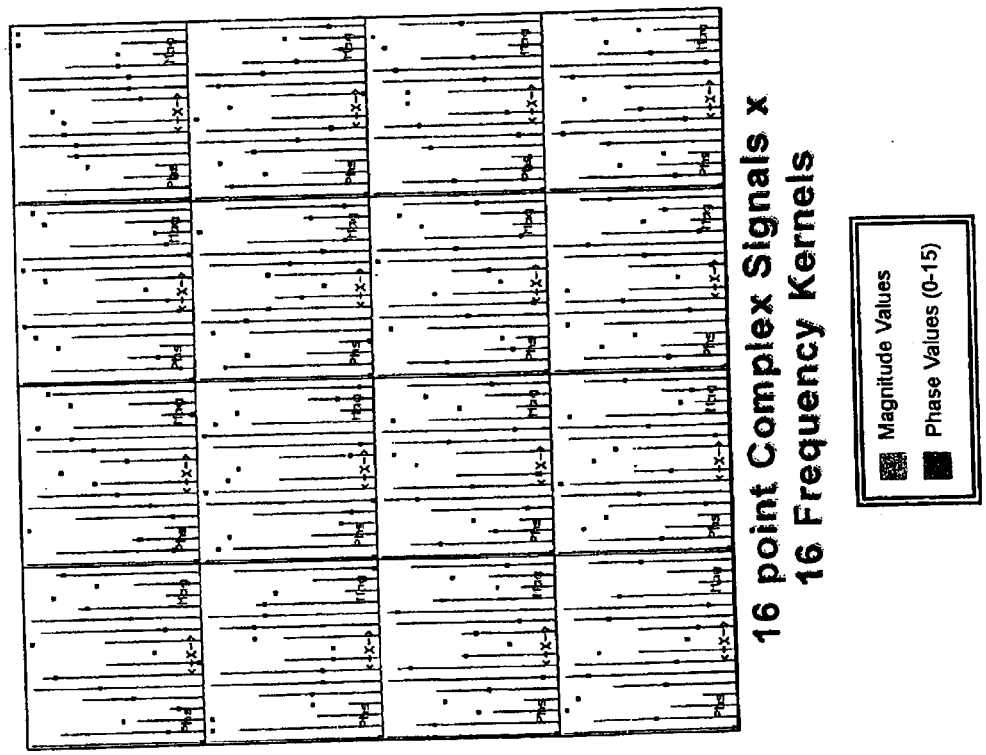

This example is similar to Example 3, except that now the two frequencies present are frequency 2 (as before) and frequency 5. When these two components are added, we obtain a resulting signal with three peaks (5−2=3). In FIG. 7A, the plots at positions 2 and 5 show that the resulting phases are lined up with the magnitude peaks, which does not occur in the other plots. In the polar plots of FIG. 7B, there are strong responses in the plots corresponding to frequencies 2 and 5, but not in the other plots, except at plots 10 and 13, which appear to have unexpected responses, resembling sidelobes. The other plots have varied patterns, but they are all symmetric and thus add to complex zero.

Example 5

Figure 8B:
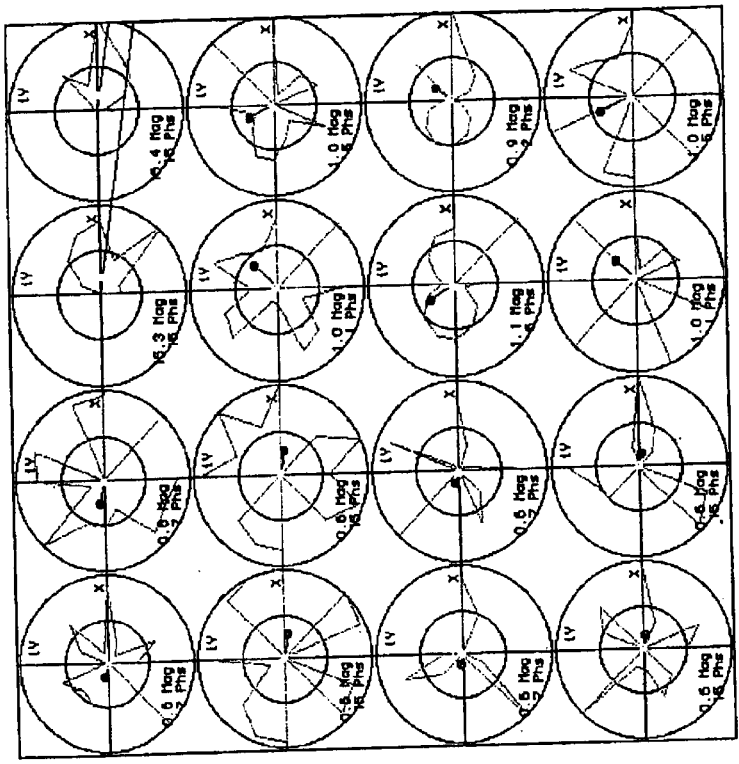
Figure 8A:
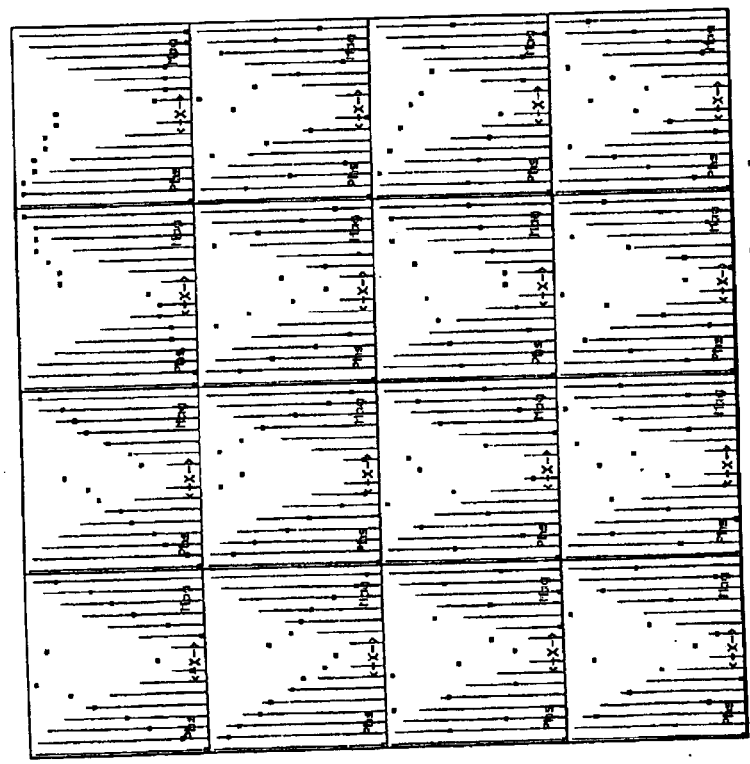

This example is similar to the previous two, except that now the two frequencies are 2 and 3. As a consequence we see in FIG. 8 that the complex sum of these two frequency components produces a single peak (3−2=1). Notice the relationship of the phases to the magnitudes in the modified signal plots. In the polar plots on the right, we obtain the strongest responses in plots 2 and 3, but these do not have the same shape as in the previous examples. There are additional unexpected responses in the other plots, which seem to resemble sidelobes or noise.

Example 6

Figure 9B:
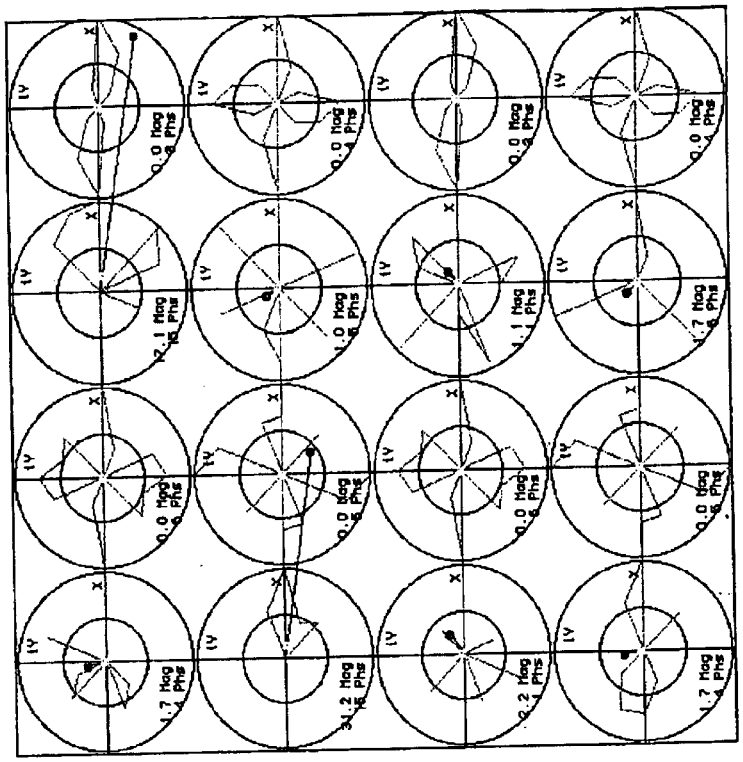
Figure 9B:
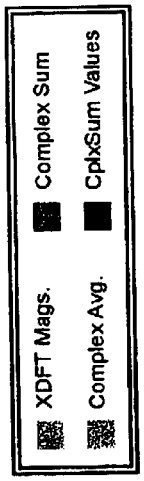
Figure 9A:
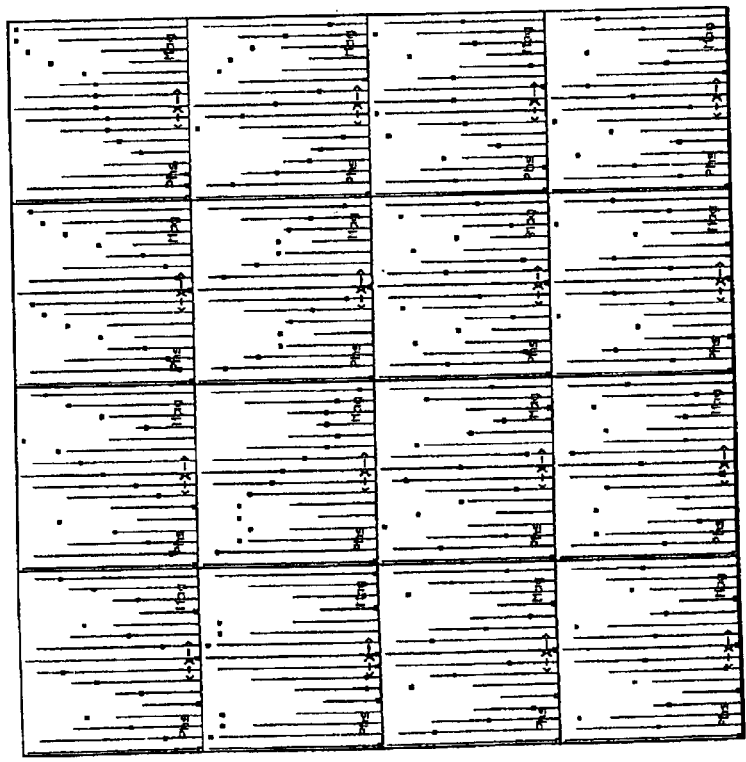
Figure 9A:
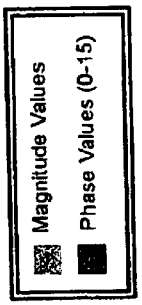

The last case illustrates what happens when two frequencies added together have different magnitudes. This example has the same two frequencies as Example 3 (2 and 4), but the magnitude of frequency 4 is twice as large as that of frequency 2. The main difference this produces in the signal plots of FIG. 9A is that, while there are still two peaks, the minimum values do not extend down to zero. In the polar plots of FIG. 9B, while we see the two strongest responses in the plots for frequencies 2 and 4, they do not have the same form as before. In addition, we see unexpected responses which look very much like sidelobes (since they occur only at every second plot position).

These 6 examples illustrate the effects of spatial frequency kernels or phase ramps on simple signals, where the exact composition of the signals is known. Applying the XDFT calculations to these simple examples gives polar plots showing very different patterns, which seem to have little direct correlation with the frequency kernel being used in each case, though there are some interesting symmetries in the arrangement of the plot patterns. These results suggest that the patterns in the XDFT plots are independent of the complex sum that is the output of the Discrete Fourier Transform, and are not completely determined by the kernel that is applied in each case, but rather by the contents of the data in the signal.

These conclusions were tested and verified in the following examples and, based upon simple simulations, it was shown that the conclusions are valid in the case of real synthetic aperture radar data.

Example 7

Experiments were carried out using synthetic aperture radar (SAR) data of cone sphere (FIG. 10) and canoe (FIG. 11) objects. These objects are described in more detail below.

The processing steps used to carry out the computational experiment to assess the XDFT are illustrated in FIG. 1. The key stages of the technique, and how they are related to these processing steps, are listed as follows:

Acquired complex signal phase history data (256×256, polar plotted), a test and a reference case for each of two objects, a cone sphere and canoe object—from a company which specializes in radar measurements. This data was collected from their indoor diagnostic radar measurement chamber.

Utility programs were written to read, write, convert, scale, and display floating point and byte array data (image and signal domains), 256×256 in size, using gray or black & white display tables. Commercial and freeware packages were also used for data display. The various programs included:

A program to compute and save the Extended Discrete Fourier Transform (XDFT) which consisted of 256×256 (65536) image elements, times 256 magnitude values (one for each of 256 phases). These XDFT results were calculated and then stored in 65336 files inside 256 folders. This calculation involved over 4 billion operations (256 complex phase, 16 history input values, times 2 complex image output values).

A program to calculate the standard Complex DFT from the outputs of the Extended DFT results.

Programs to plot the 256-phase magnitudes of the XDFT for a single image point, (in both raw and smoothed forms) on the complex plane.

Programs to create and display simple, simulated signals with only 16 points, containing 1 or 2 frequendes, along with their corresponding XDFT plots. The purpose of these simulations was to better understand how frequency kernels affect signals, under ideal, known conditions, and how these effects show up in the XDFT plots for each image domain point or spatial frequency.

Observed characteristics of the XDFT points plots to determine distinctive qualities or distinguishing features, and decide how they could be measured by different shape or statistical calculations.

Generated specific statistics and parameters, based on observations of the point plots, to calculate shape type (number of points or sides), shape strength, convexity vs. concavity (polygons vs. stars), and texture.

Programs to calculate these parameters, including rules to decide which points were "distinctive" (having an identifiable shape). Information on these was saved in text files and later printed out and placed a data binder Constructed parametric images from these computed values; compared the resulting images to the standard Complex DFT result, in terms of additional information gained, and/or improved image quality.

Programs were also written to compute the XDFT results, followed by analysis and display of the XDFT plots for each image point. This was followed by selection of important parameters and statistics, which were used to generate parametric images for comparison with the standard DFT complex output.

Nine different statistics or parameters were chosen for calculation on the XDFT plots for each image point:

Standard deviation of magnitudes (raw and smoothed plots)
Perimeter of magnitude plot (raw and smoothed plots)
Fourier Shape class (number of sides or points, for raw and smoothed plots)
Fourier Shape score (raw and smoothed plots)
Complex sum (highly smoothed plot)

The standard deviation calculation for the raw and smoothed magnitudes is reasonably simple. This number was much larger (especially in the smoothed plots), for shapes that were pointed (star-like) instead of sided (polygon-like), so this seemed a good measure to distinguish this trait.

The perimeter was calculated as the sum of the absolute differences between adjacent magnitudes (measured in terms of plot coordinates), plus 1 (a perfect circle would have a value of 256). These values were then divided by 256 to give an average deviation between adjacent phases, which would have values with ranges similar to the standard deviation values. This parameter seemed to be related to the texture of the plots, whether it went up and down rapidly, (fine texture) or more in groups (coarse texture). Larger perimeters appeared to correspond to finer textures, since the values were changing more rapidly. (An attempt was also made to measure this feature of the plots by counting the number of times the values crossed the average, or mean, magnitude value, but the perimeter calculation worked better).

One of the most important characteristics of the XDFT plots (examples are shown in FIGS. 22-39) are their shapes. While many of them simply look like random, noisy circles, others have very distinct shapes, such as polygons or stars, with 2, 3, 4, 5 or more sides or points. To try to classify them accurately using their shape "numbers," another Fourier-type calculation, known as "Fourier shape descriptors" was used. To do this, the 256 phase and magnitude vectors of an XDFT plot (raw or smoothed) were input, rotated these phases by different rates or frequencies (1 to 12 for objects with 1–12 shapes or sides), and then added the rotated complex results, just as with the DFT, to obtain a complex value and its resulting magnitude.

The effect of rotating these complex vectors by a certain rate, F, is to basically stretch the data around the circle F times. If the shape really has F points or sides, then when the data is stretched in this manner, the peaks will coincide, adding up to a larger complex value, because there is more "weight" in one direction. After doing this for all 12 shape classes or frequencies, one having the maximum complex sum as the shape class was chosen for that plot. This maximum sum was also retained as a "shape score,"which could be plotted as another parameter for both the raw and smoothed plots. To "throw out" the plots which had no distinct shape (the noisy circles), a minimum threshold was set on the shape score, so that plots with a lower value would be given a shape class of 0. One of the statistics tried was based on doing a very strong smoothing of the magnitude values (by ±64 positions or more, instead of the usual ±8). The goal of this test was to see if a "cleaner" image than the DFT would result, yet would look fairly similar, in terms of its major structures. The overall goal was remove noise and sidelobes.

A program was also written to calculate these values and classify each point by its shape characteristics in the raw and smoothed plots. If the point was considered to be "interesting" (had a non-zero shape class in one plot or the other) then its classification information would be saved.

To generate the parametric images, a series of program were written to calculate each parameter on every one of the 65536 plots, scale the result values to a byte range, and write out a byte parametric image in a form that could be later displayed with one of the look-up tables and display functions.

The test data used were based on radar measurements of two objects: a metal cone sphere (FIG. 10), and a metal canoe object (FIG. 11), both less than two feet in length. The cone sphere is an ideal and radially symmetric combination of a cone and a sphere; simple enough for its radar response to be predicted mathematically, which is why it is often used as a test object. Because of its smooth, rounded surfaces (except at the tip) it reflects most of the radar energy away. The canoe shape also reflects most of the radar energy away, but was built so that objects could be attached to the top surface.

The data were obtained from a local company which specializes in radar measurements and sensor development. Both objects were measured in a special, anechoic, diagnostic radar chamber, used by the company for carrying out radar measurement studies on small objects. In the chamber, the object is placed on a pylon and slowly rotated, while the radar fires "frequency sweeps" at it, recording the echoed responses.

In the case of the cone sphere test data, the data was collected using X-band (~12 Gigahertz) and Ku-band (12–18 GHZ), with horizontal transmit and receive polarizations (HH). This frequency range corresponds to wavelengths of a few centimeters (10 Ghz=3 cm wavelength).

The canoe was measured at Ku-band only, using vertical transmit and receive polarizations (VV).

Figure 12:
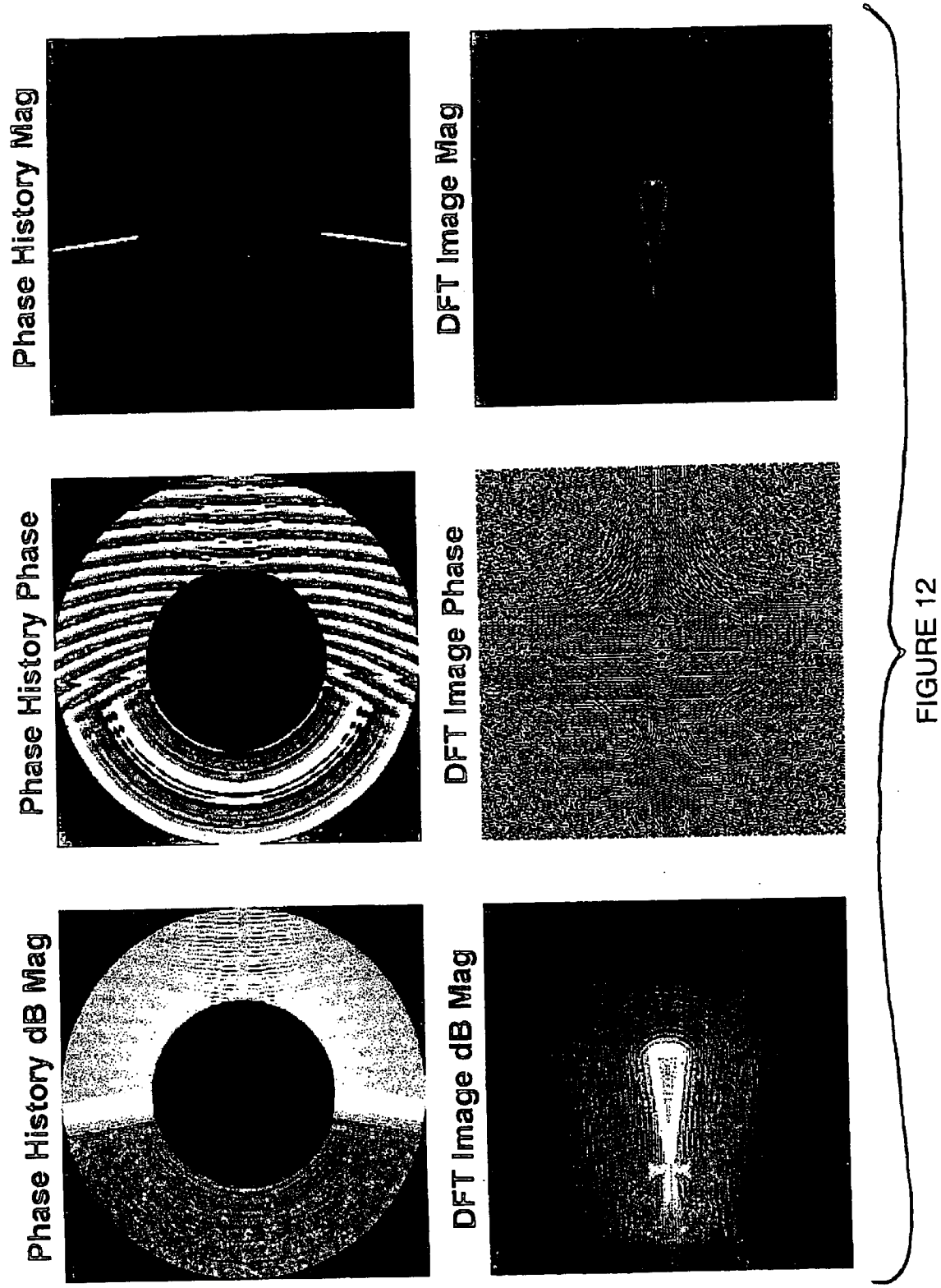
FIGS. 12 and 13 shows radar images of the cone sphere.

A full 360 degrees of data was collected, remapped to a donut, and embedded within a square of complex zeros, as shown in FIG. 12. The figure shows the magnitude of the phase history data on the far right, the phase in the middle, and the decibel (dB)-scaled magnitude on the left. Because radar data often has a very wide range (over several orders of magnitude), the dB scale is often preferred to the magnitude scale, to bring out more details. (Unfortunately, this also enhances the noise, sidelobes, and other artifacts.) For these objects, the patterns present in the phase history magnitude and phase are simple and well-behaved.

Figure 13:
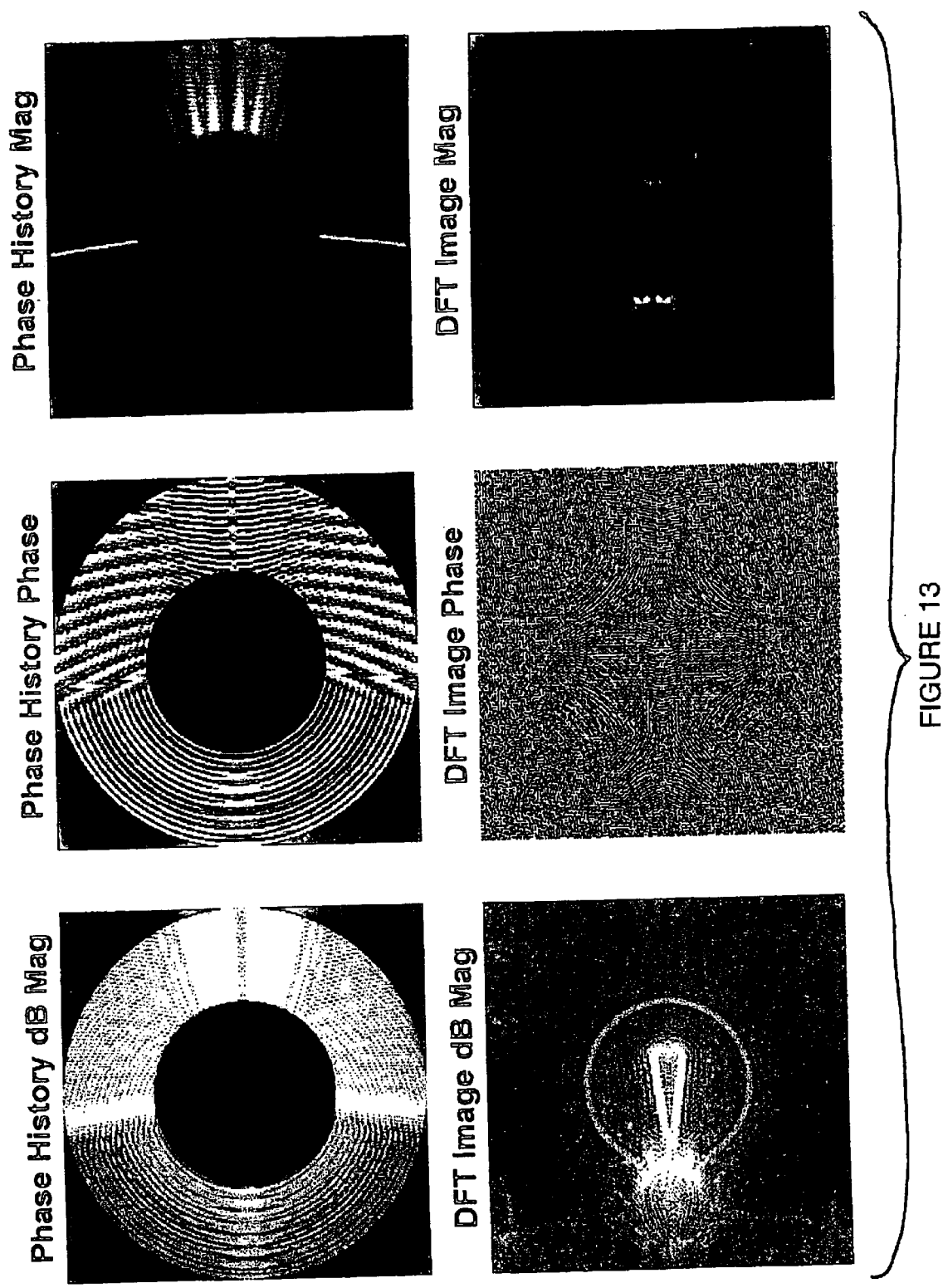
Figure 16:
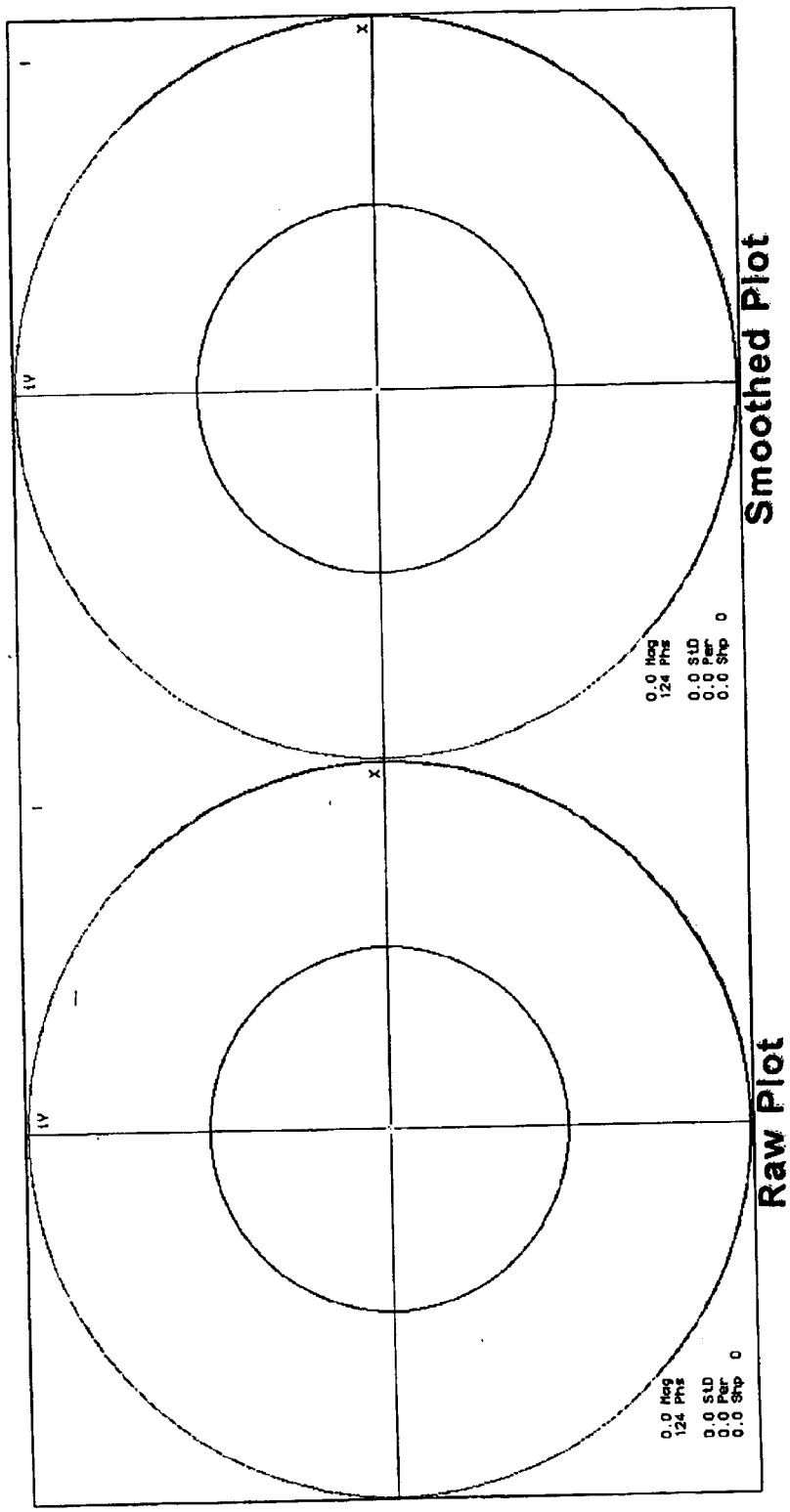
FIGS. 16-21 show raw and smoothed kernel plots.
Figure 17:
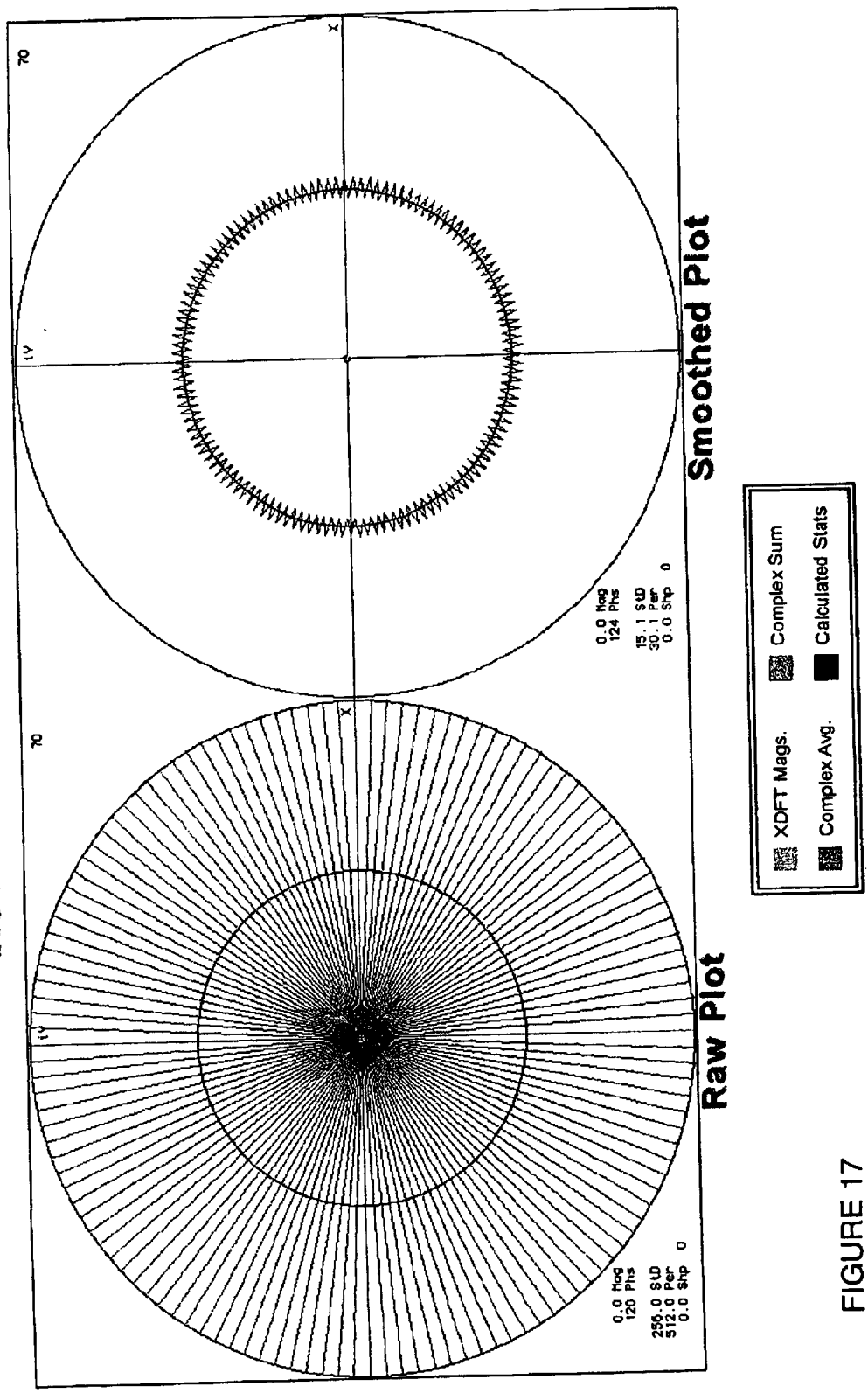
Figure 18:
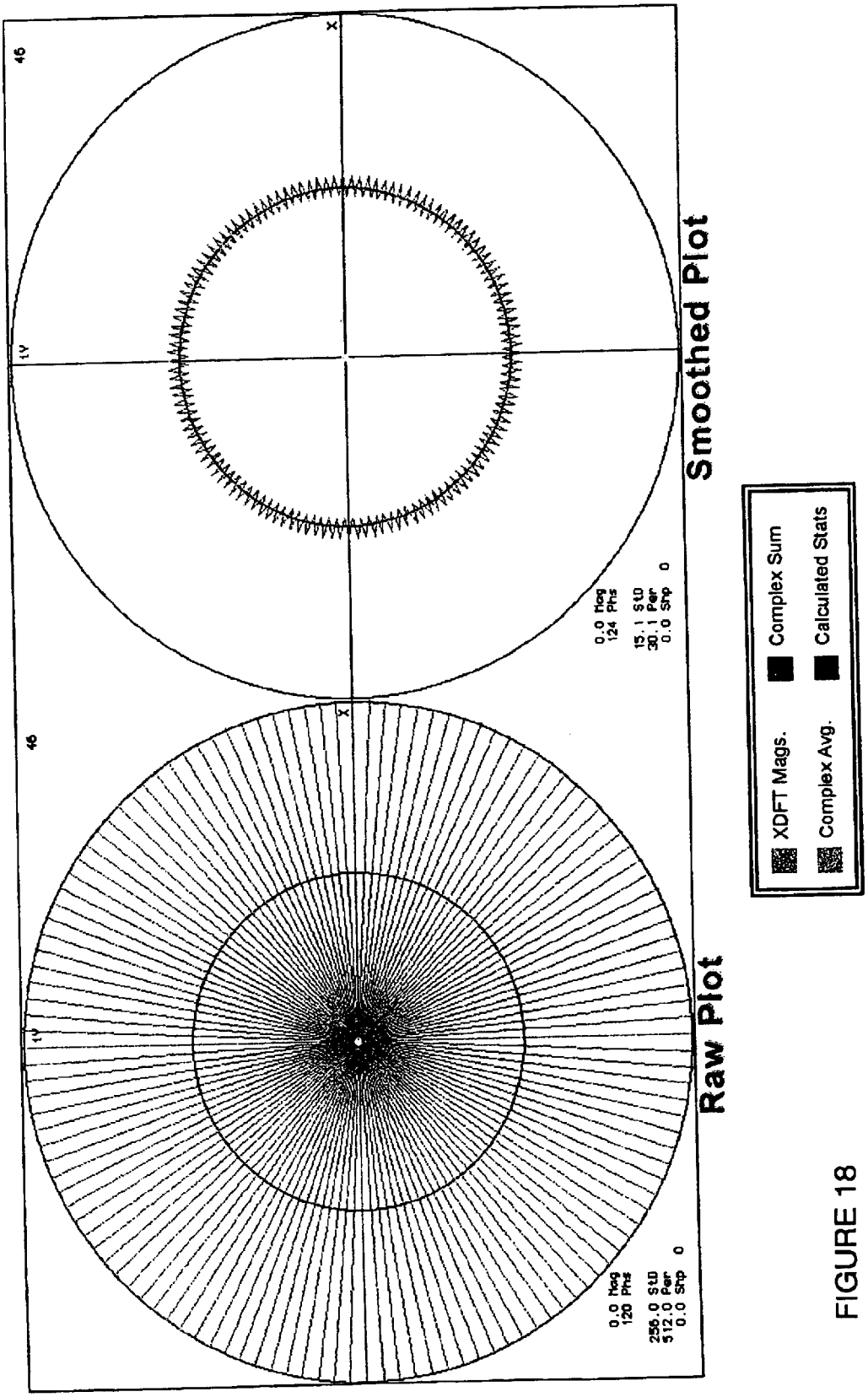
Figure 19:
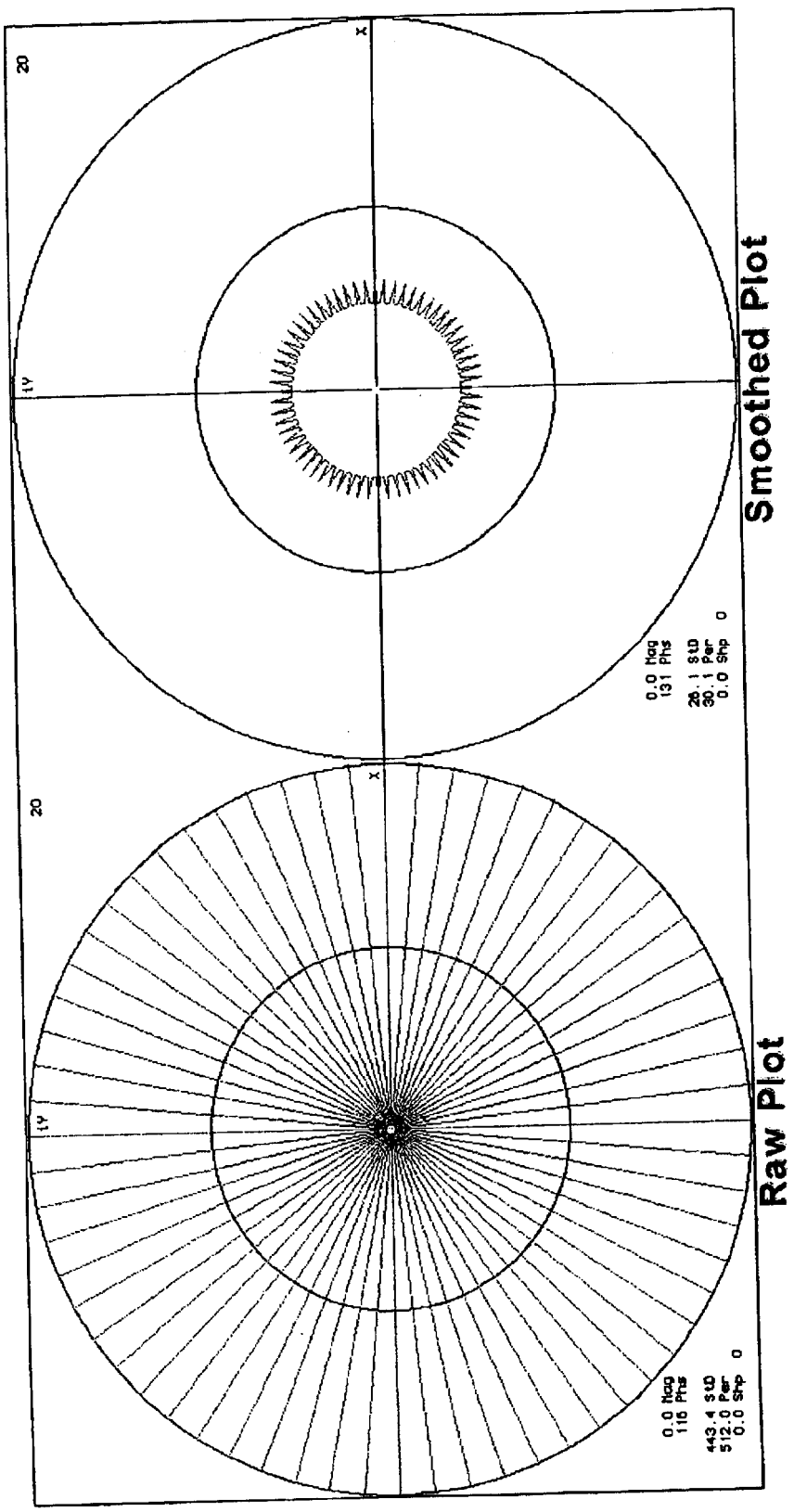
Figure 20:
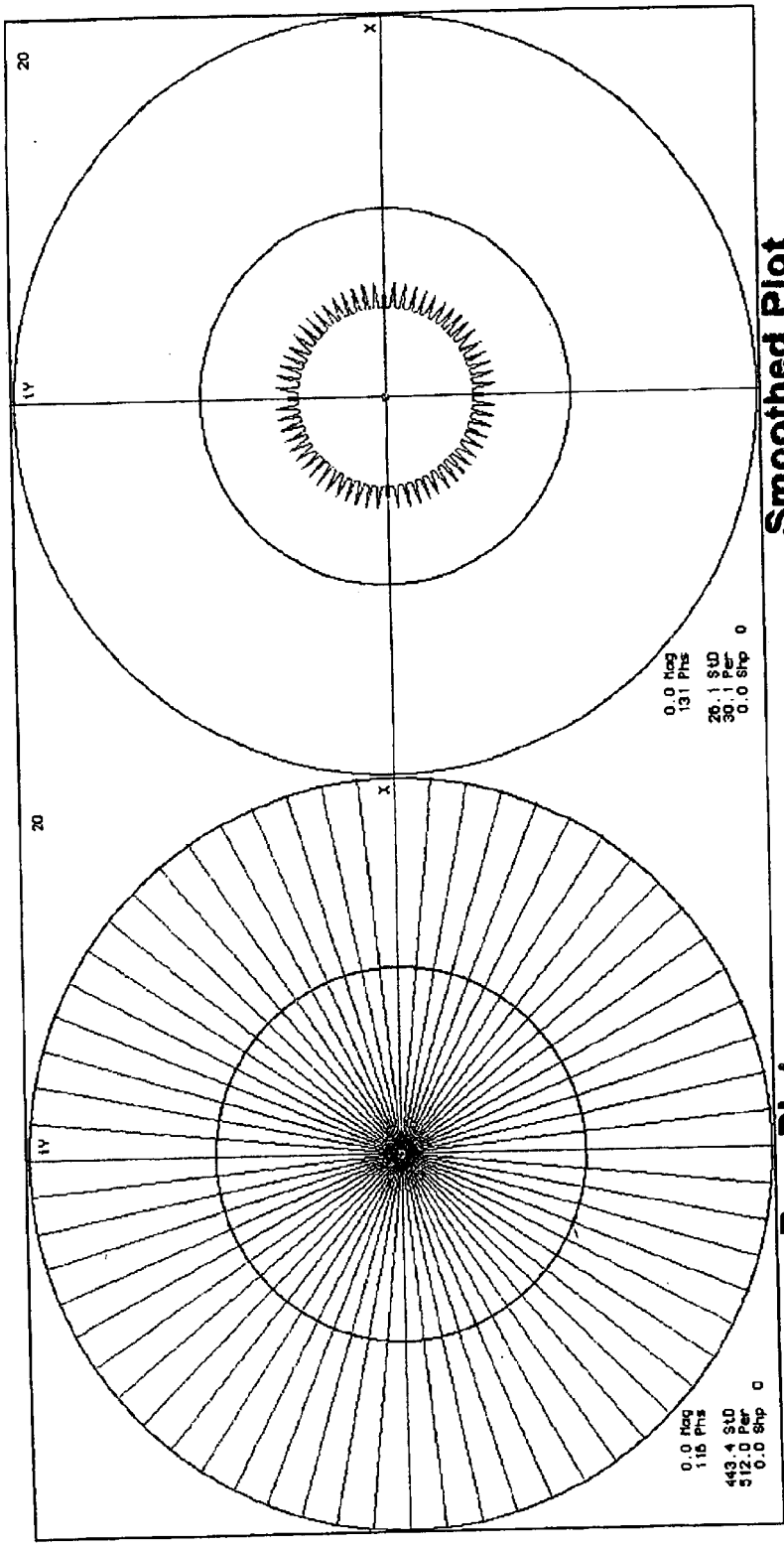
Figure 21:
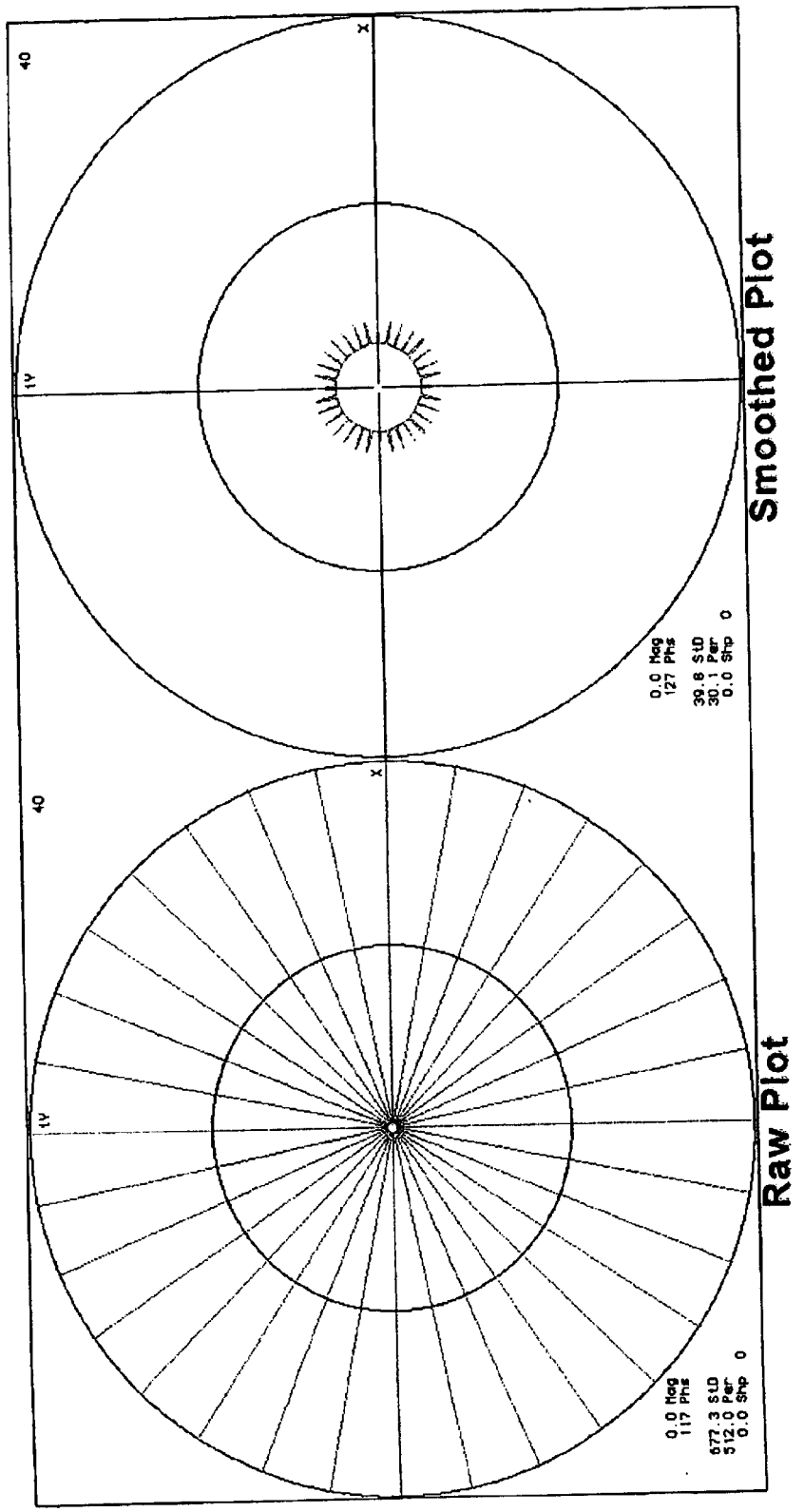
Figure 22:
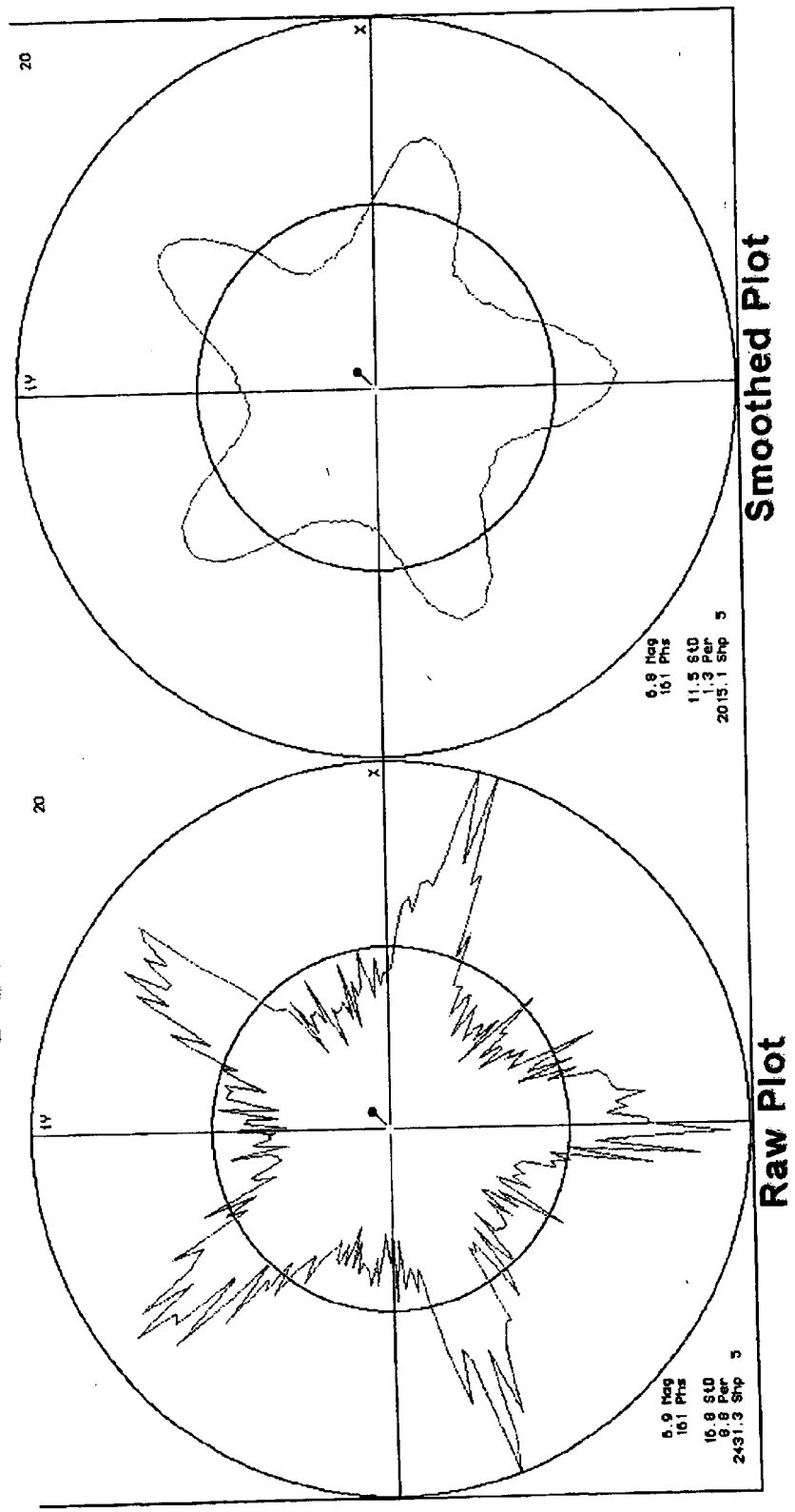
FIGS. 22-39 show raw and smoothed XDFT plots.
Figure 23:
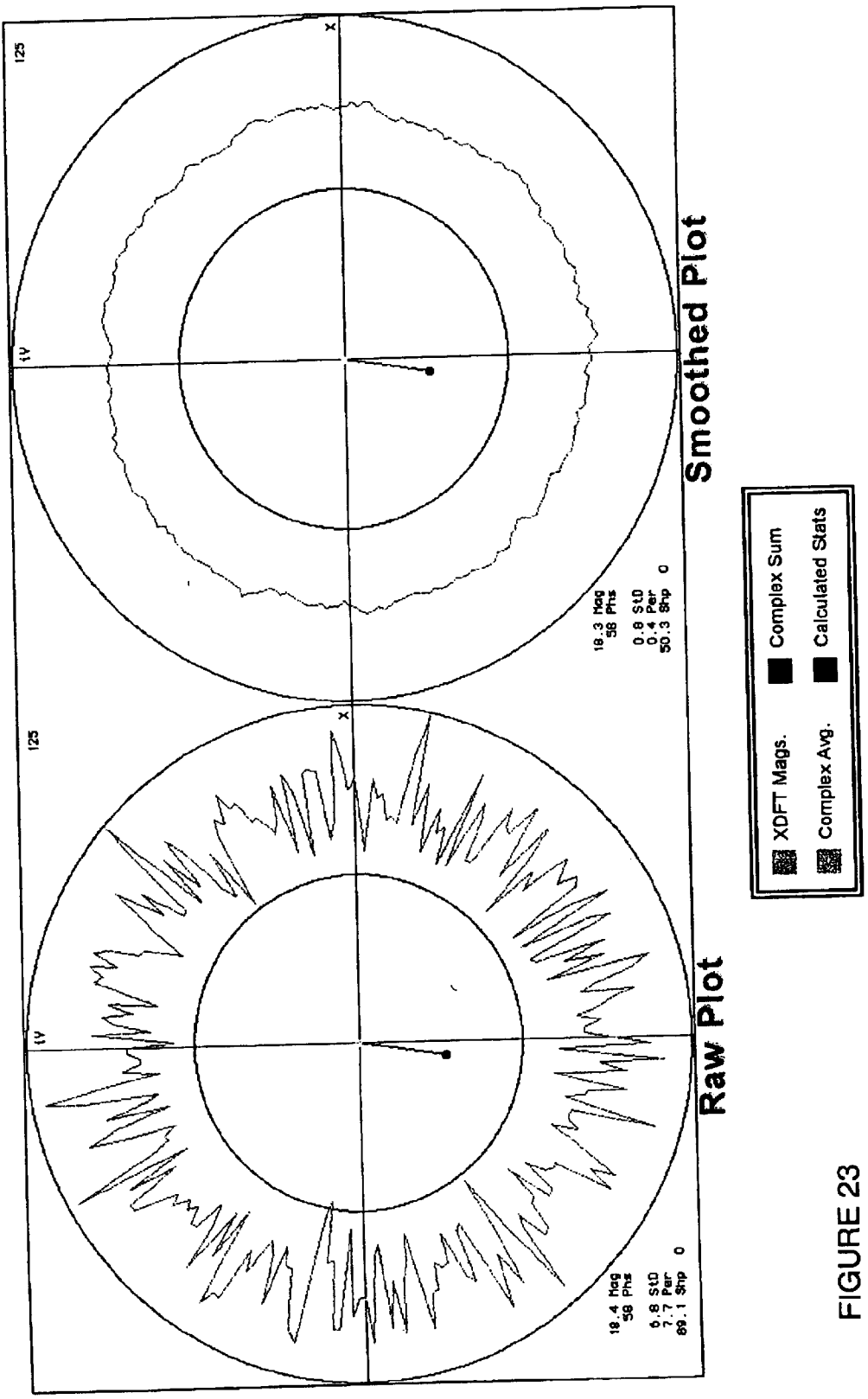
Figure 24:
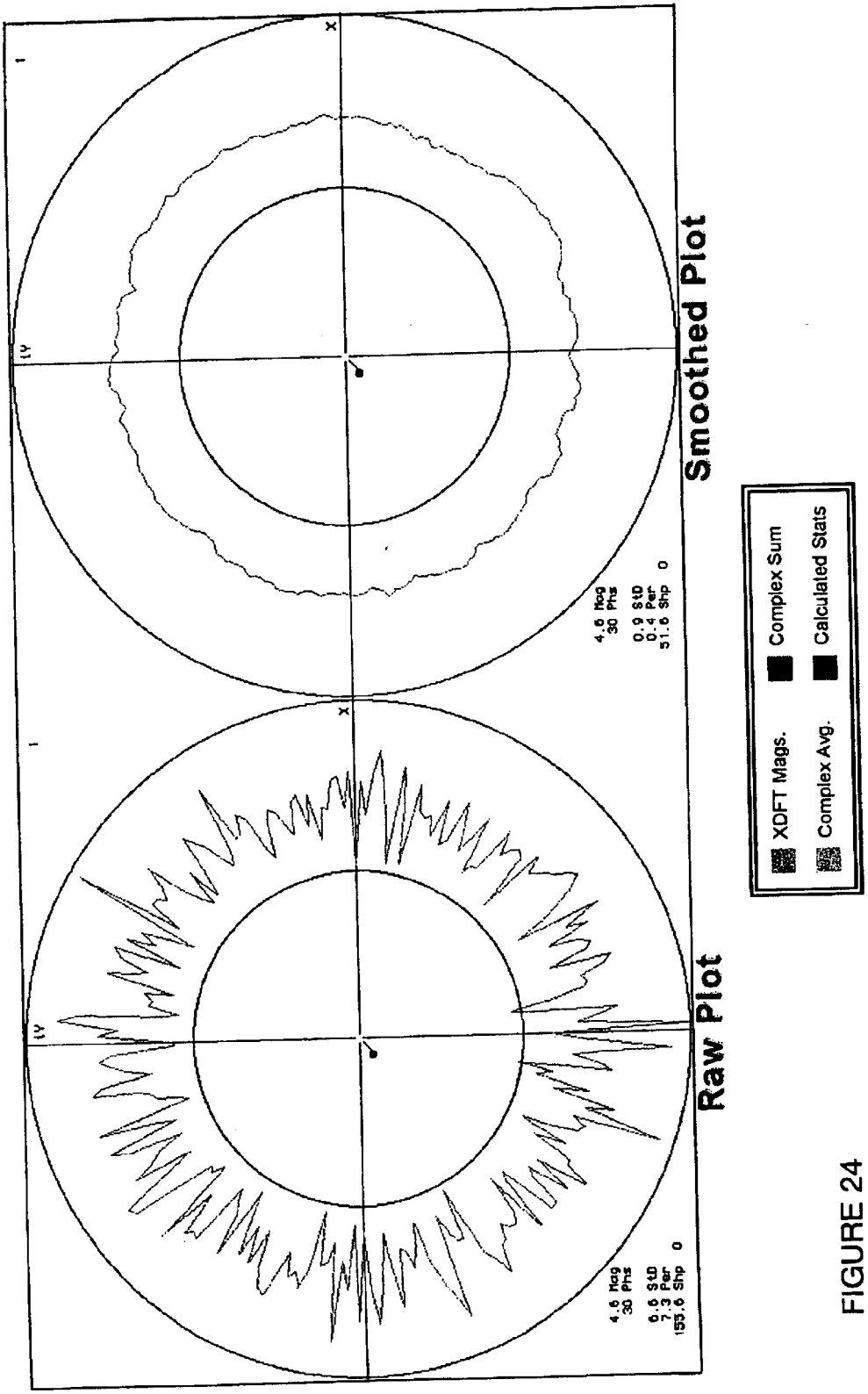
Figure 25:
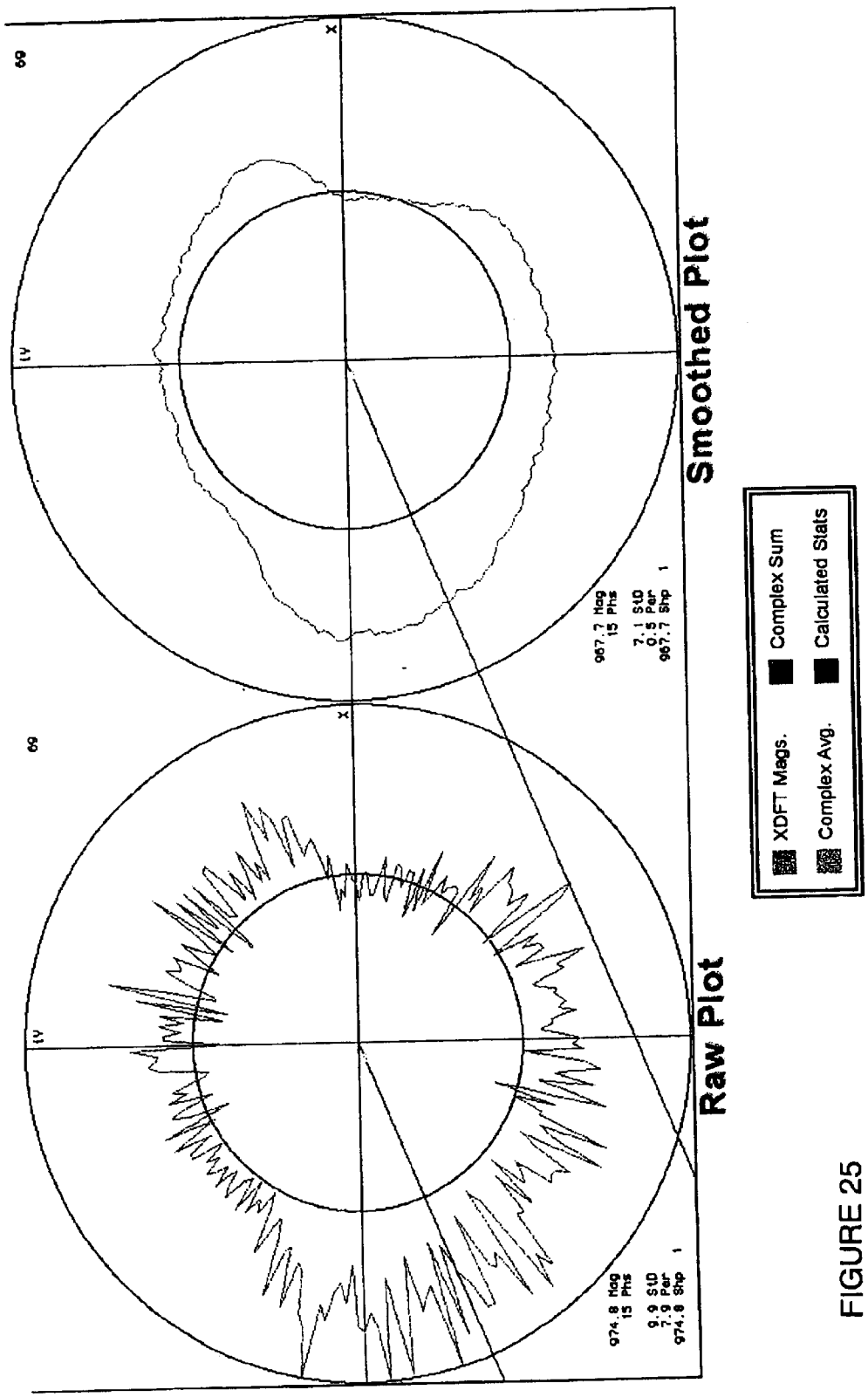
Figure 26:
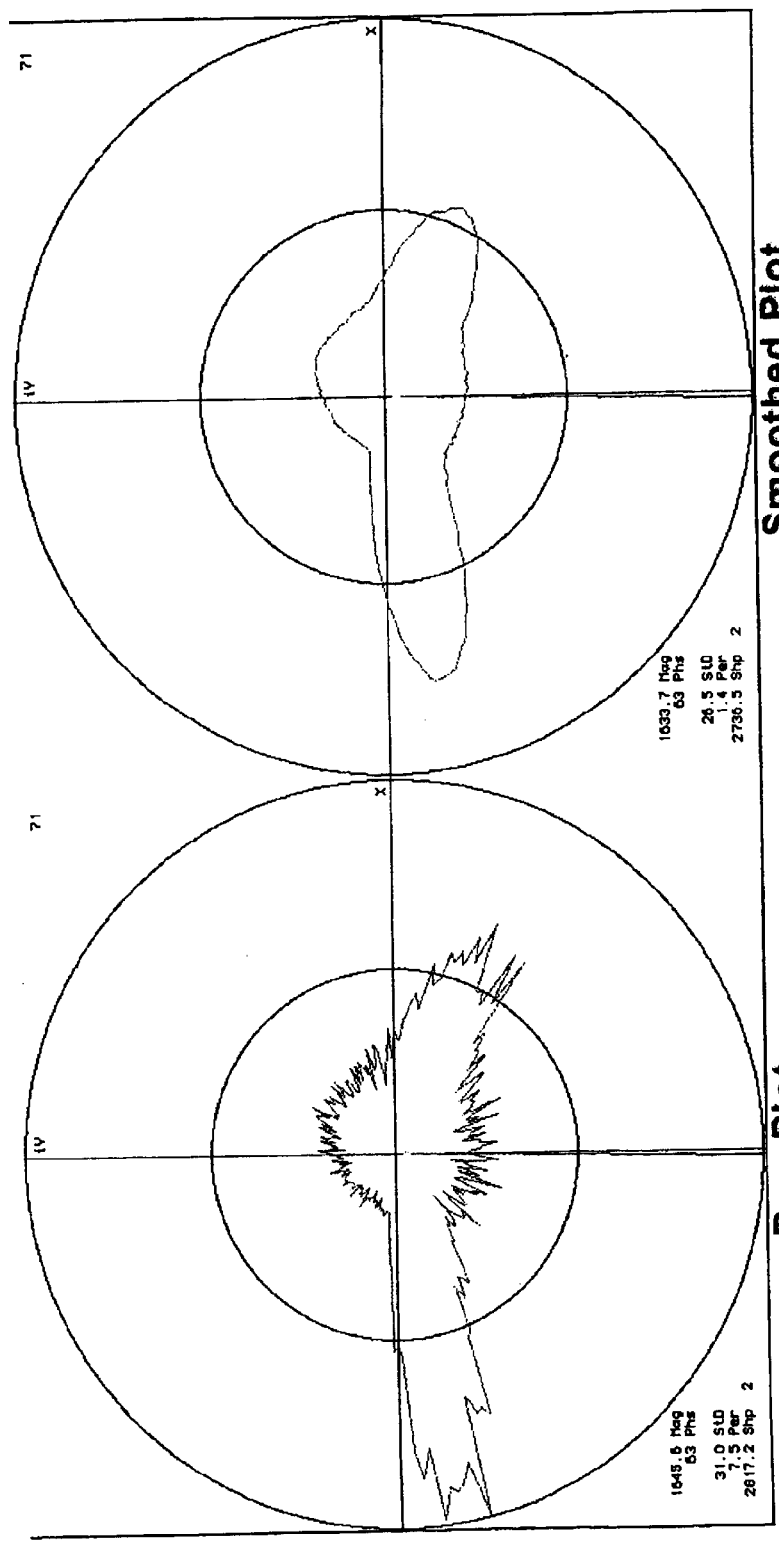
Figure 27:
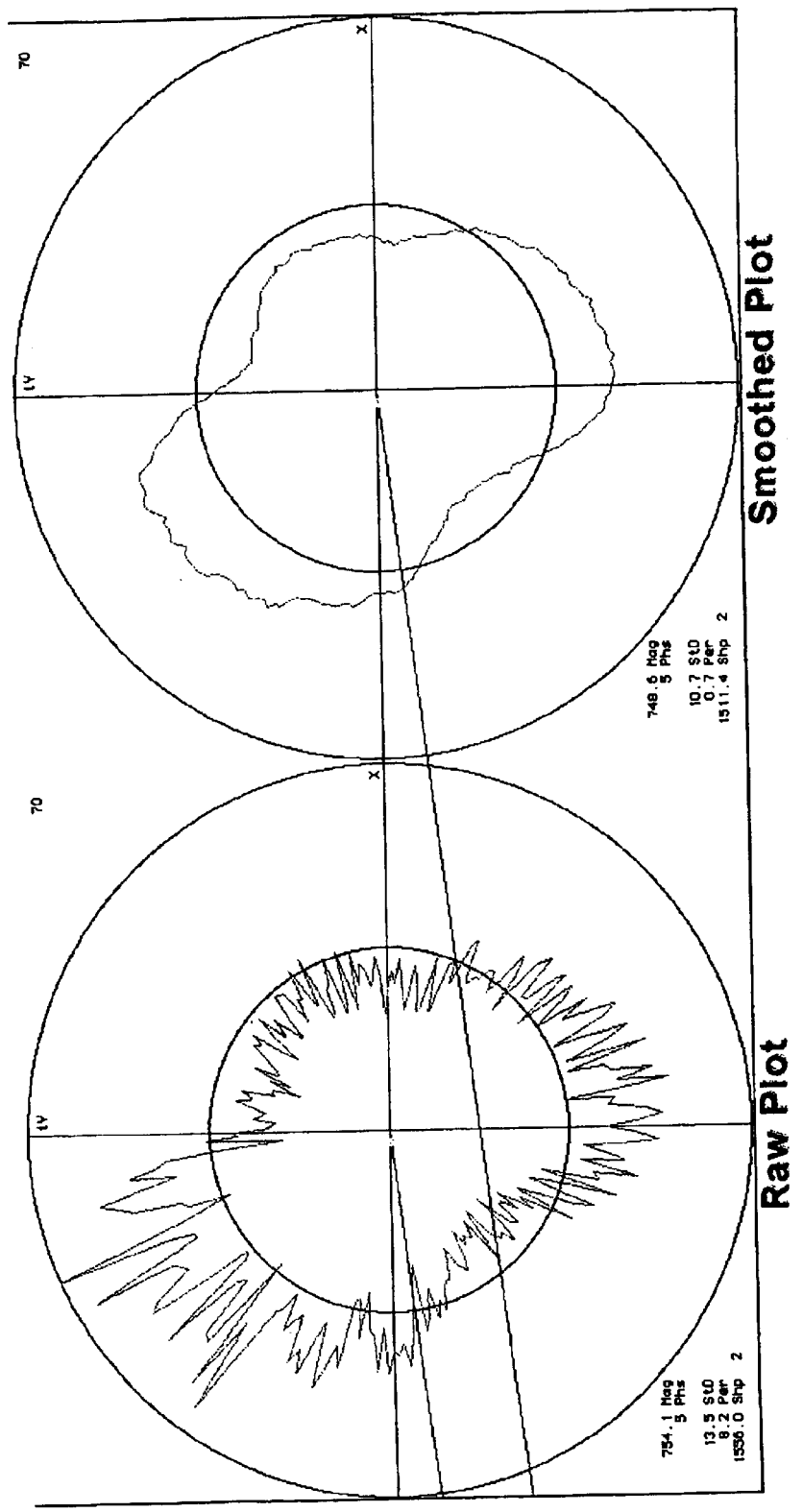
Figure 28:
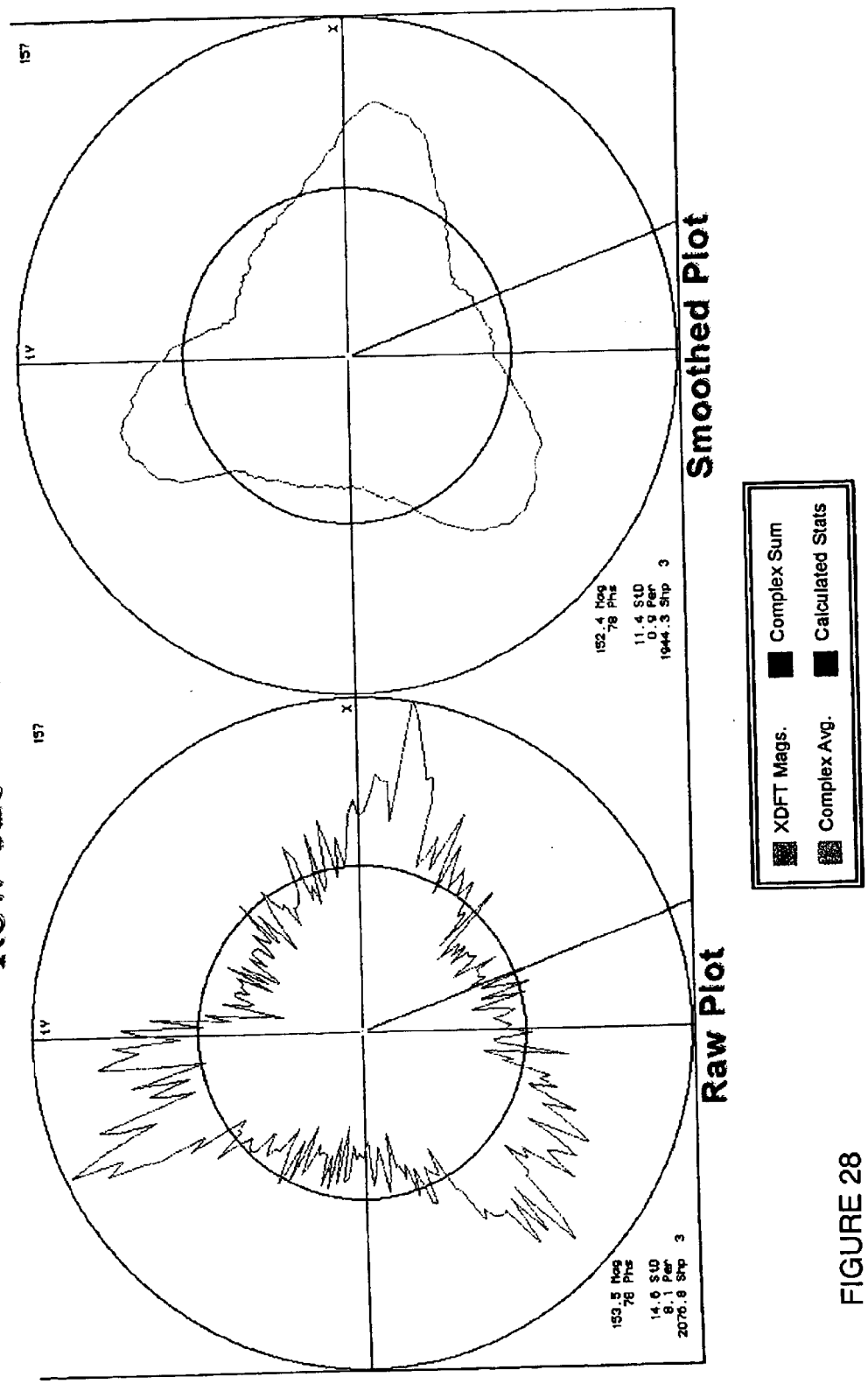
Figure 29:
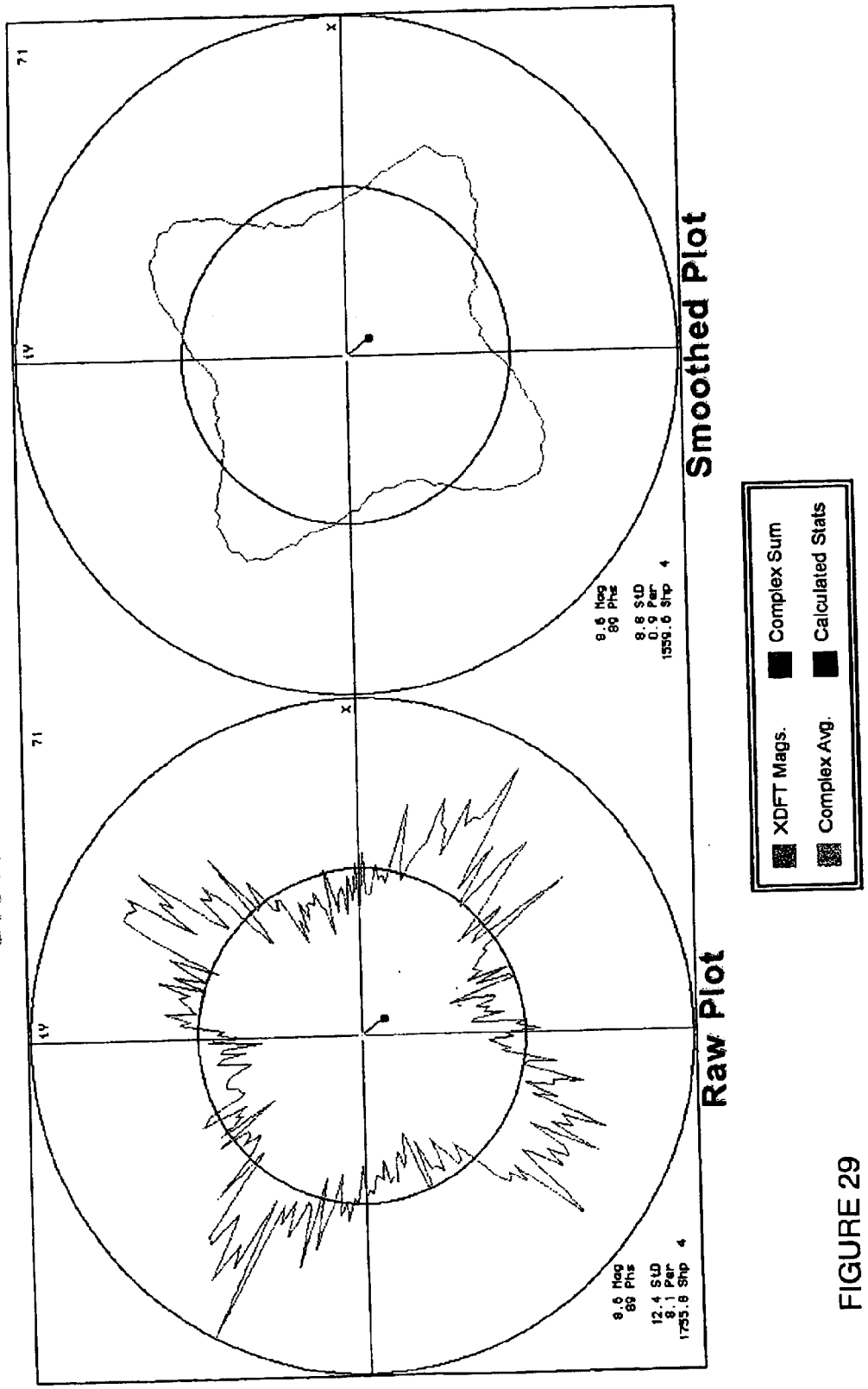
Figure 30:
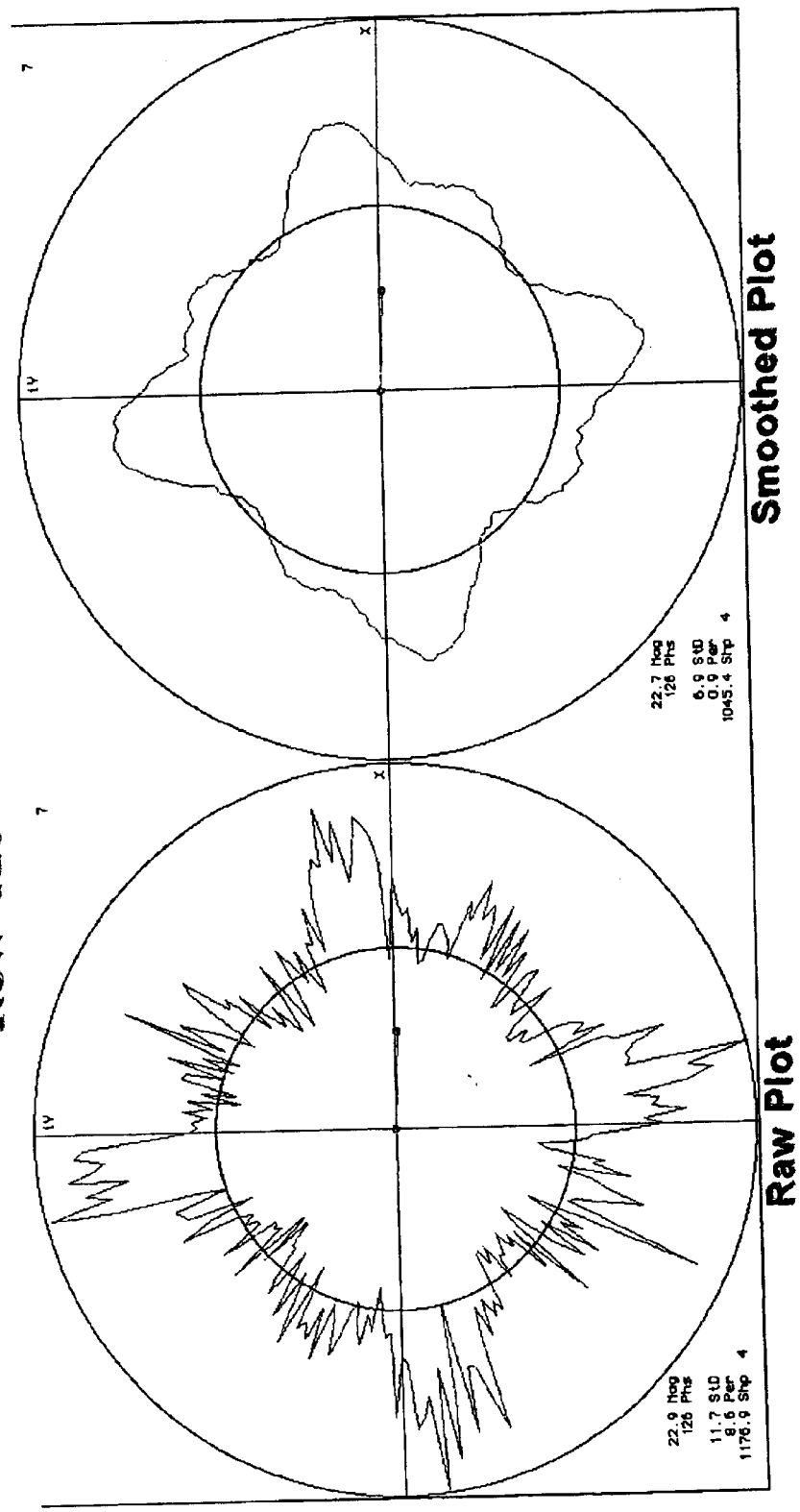
Figure 31:
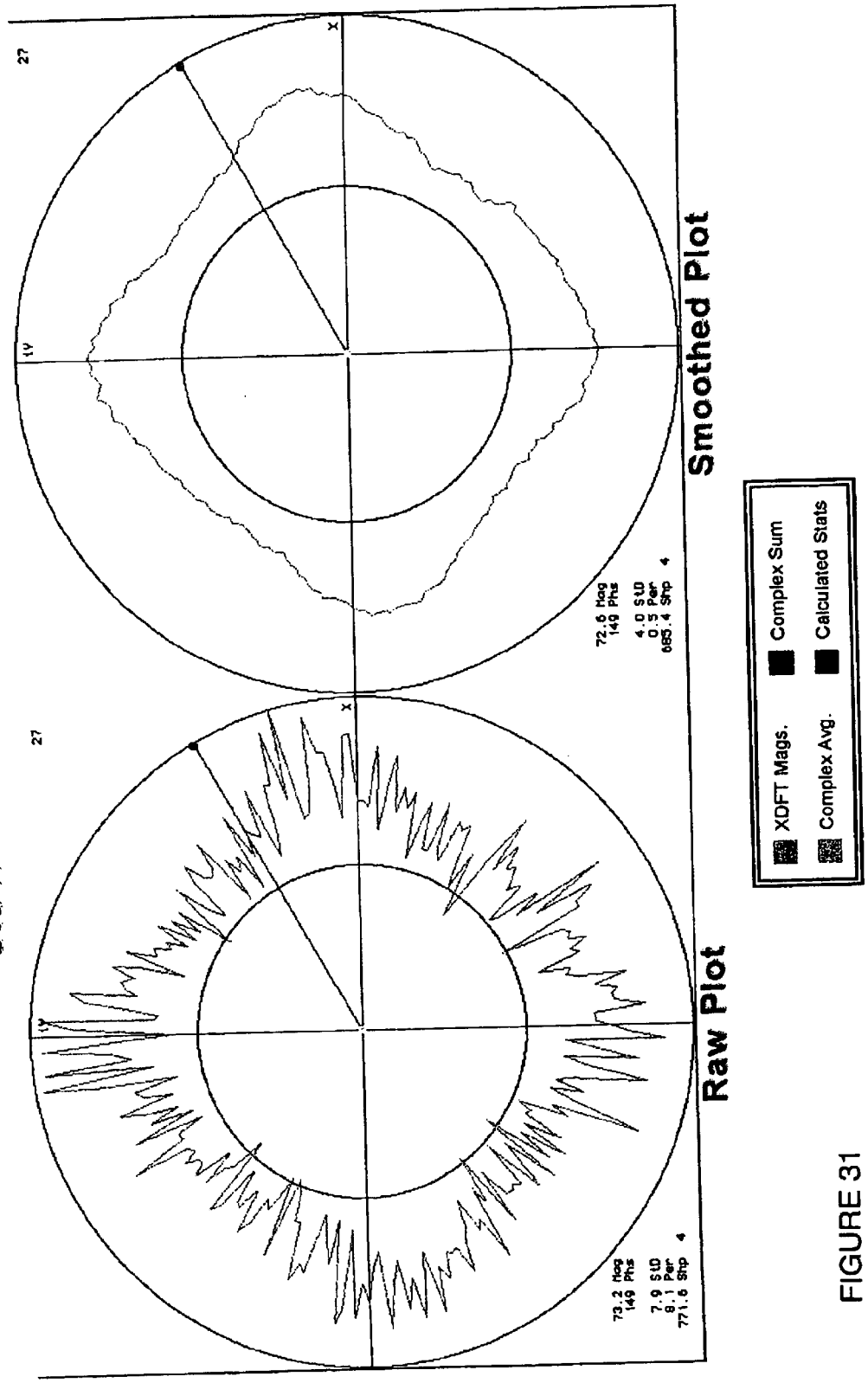
Figure 32:
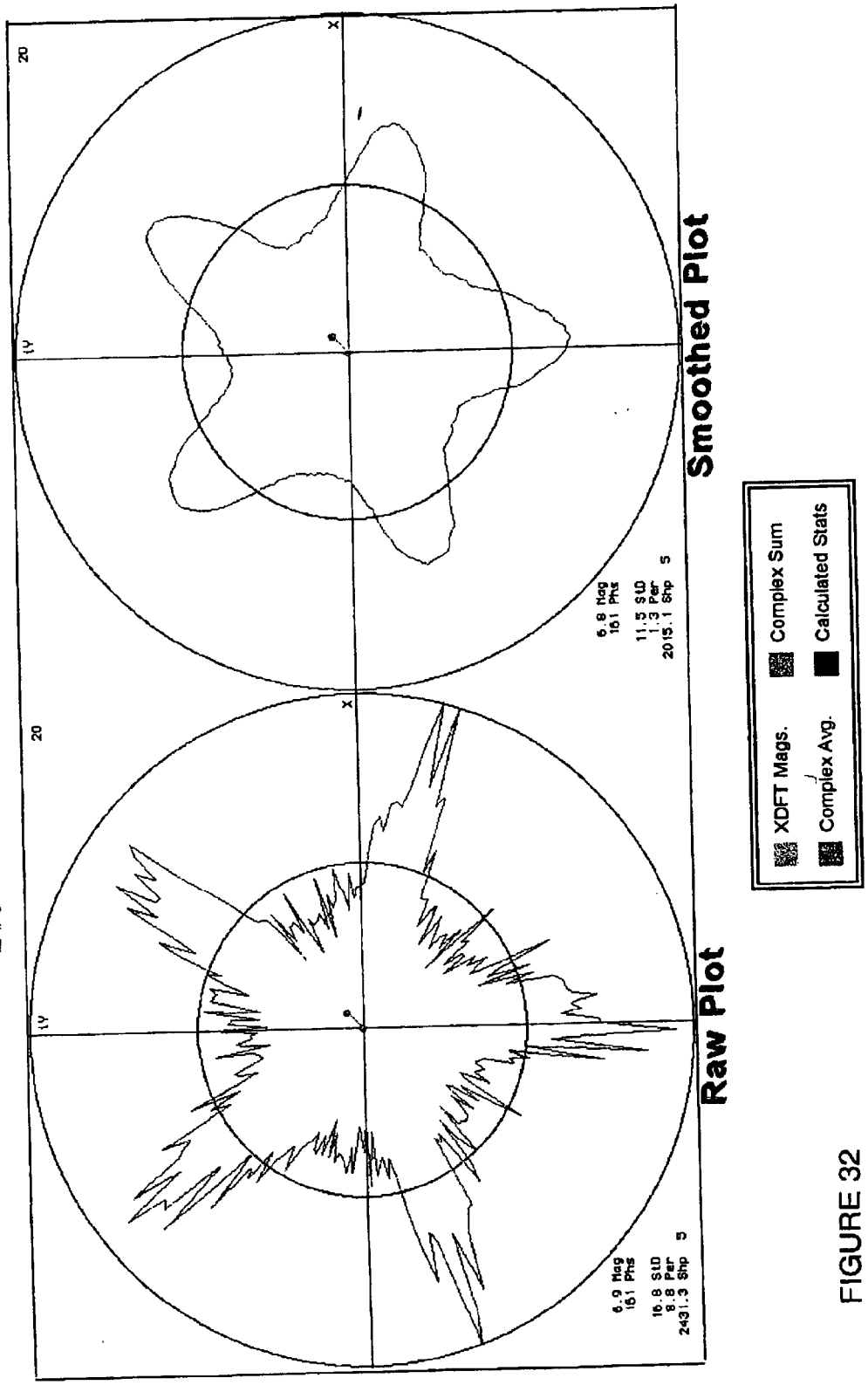
Figure 33:
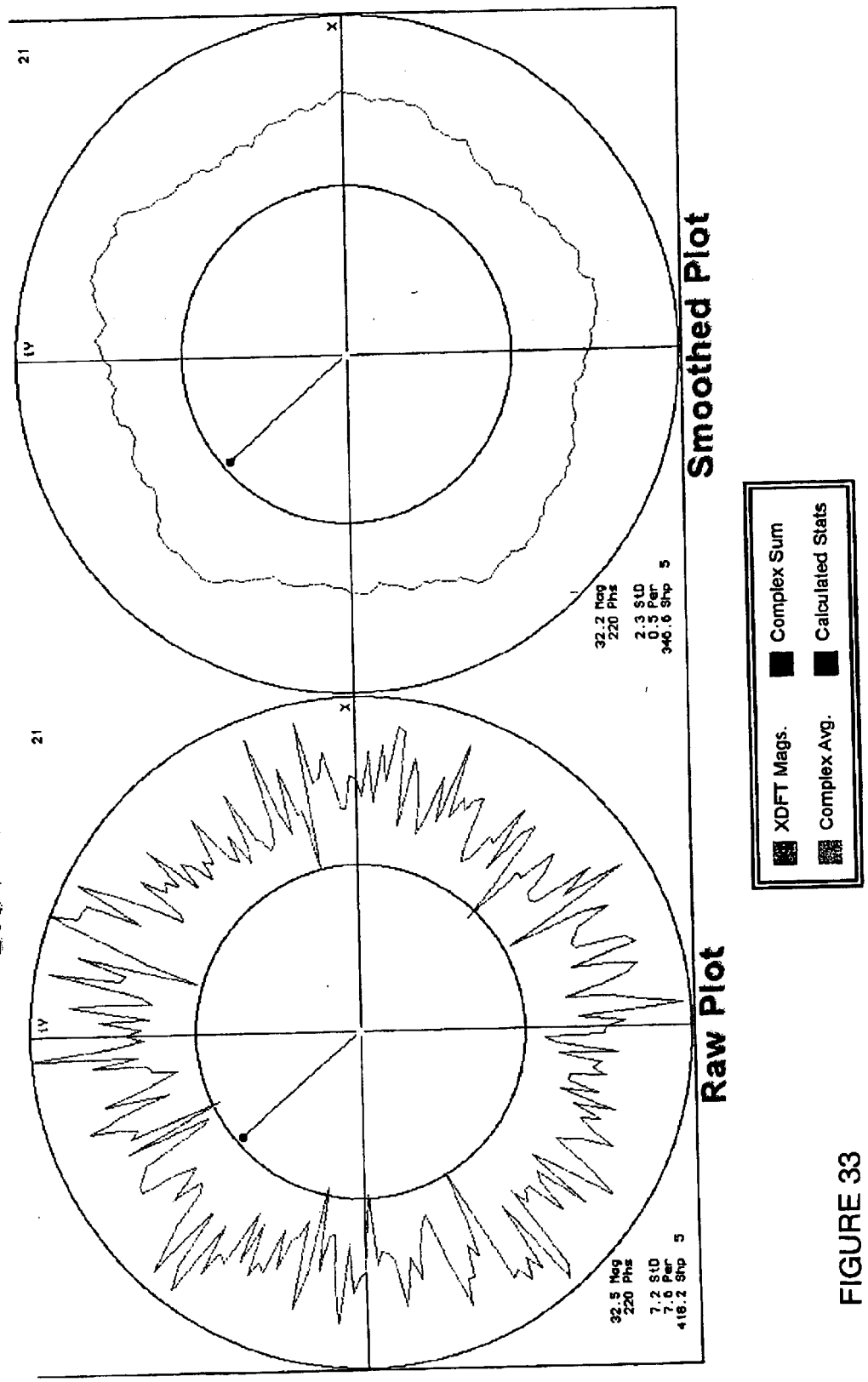
Figure 34:
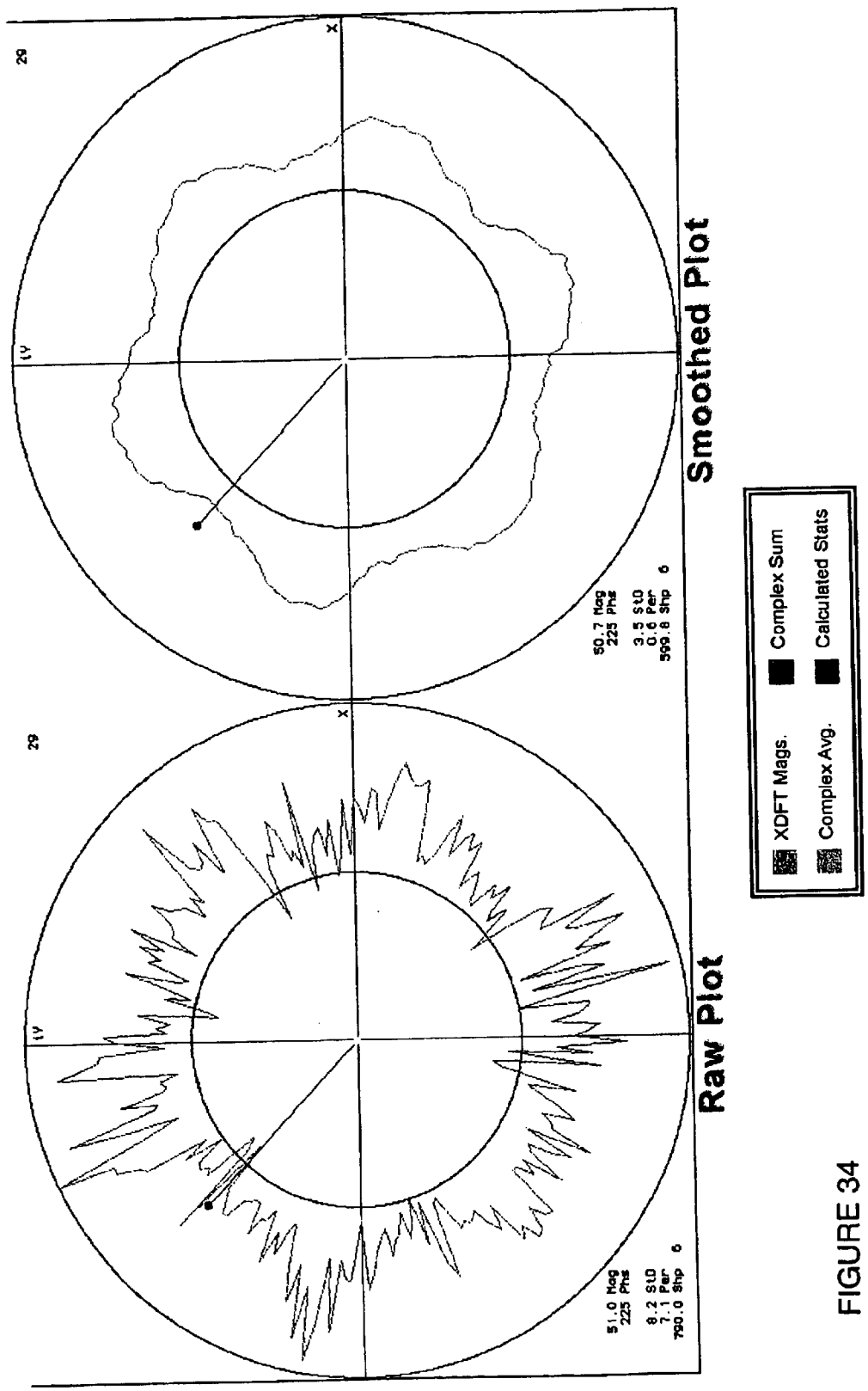
Figure 35:
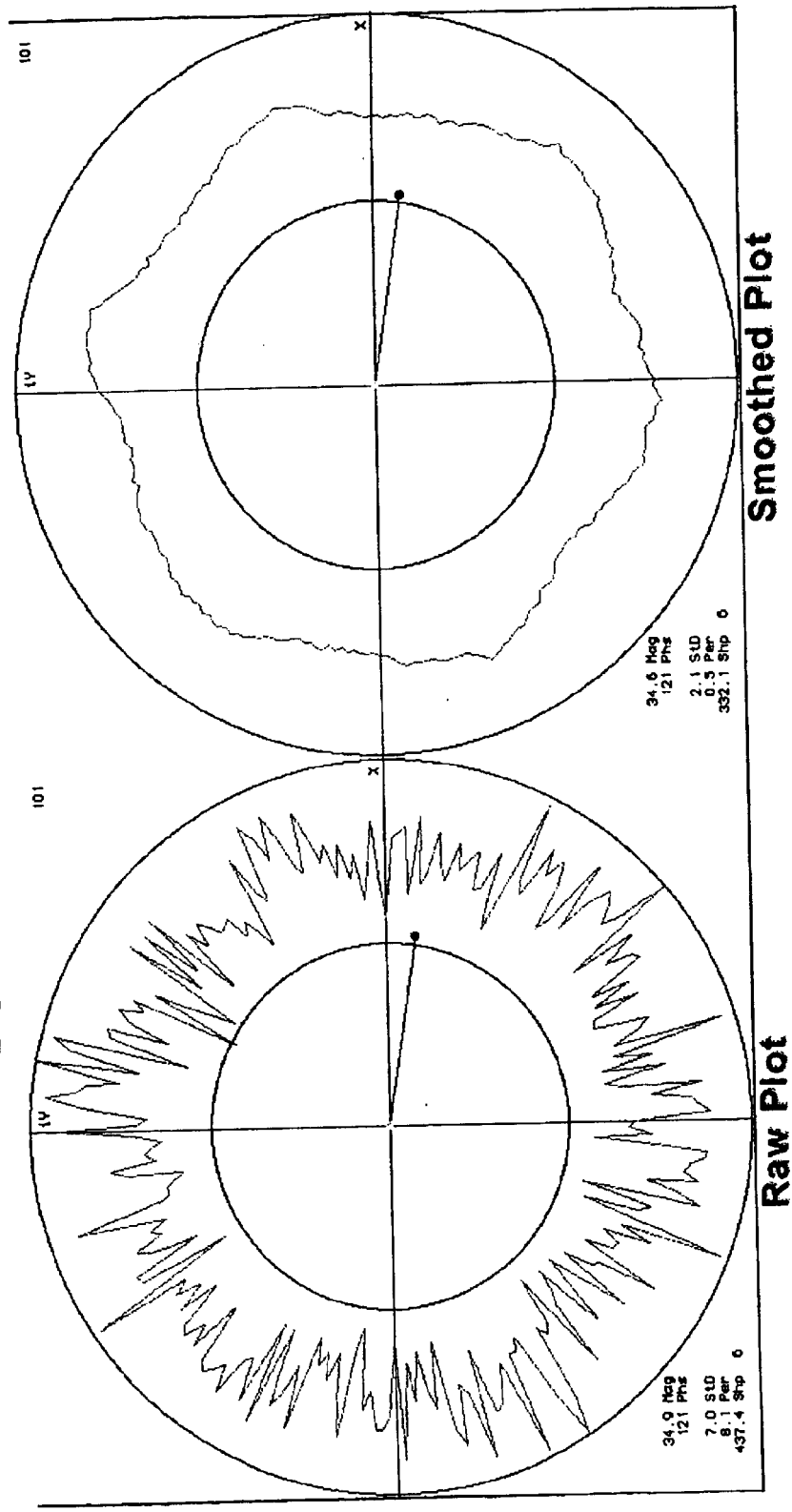
Figure 36:
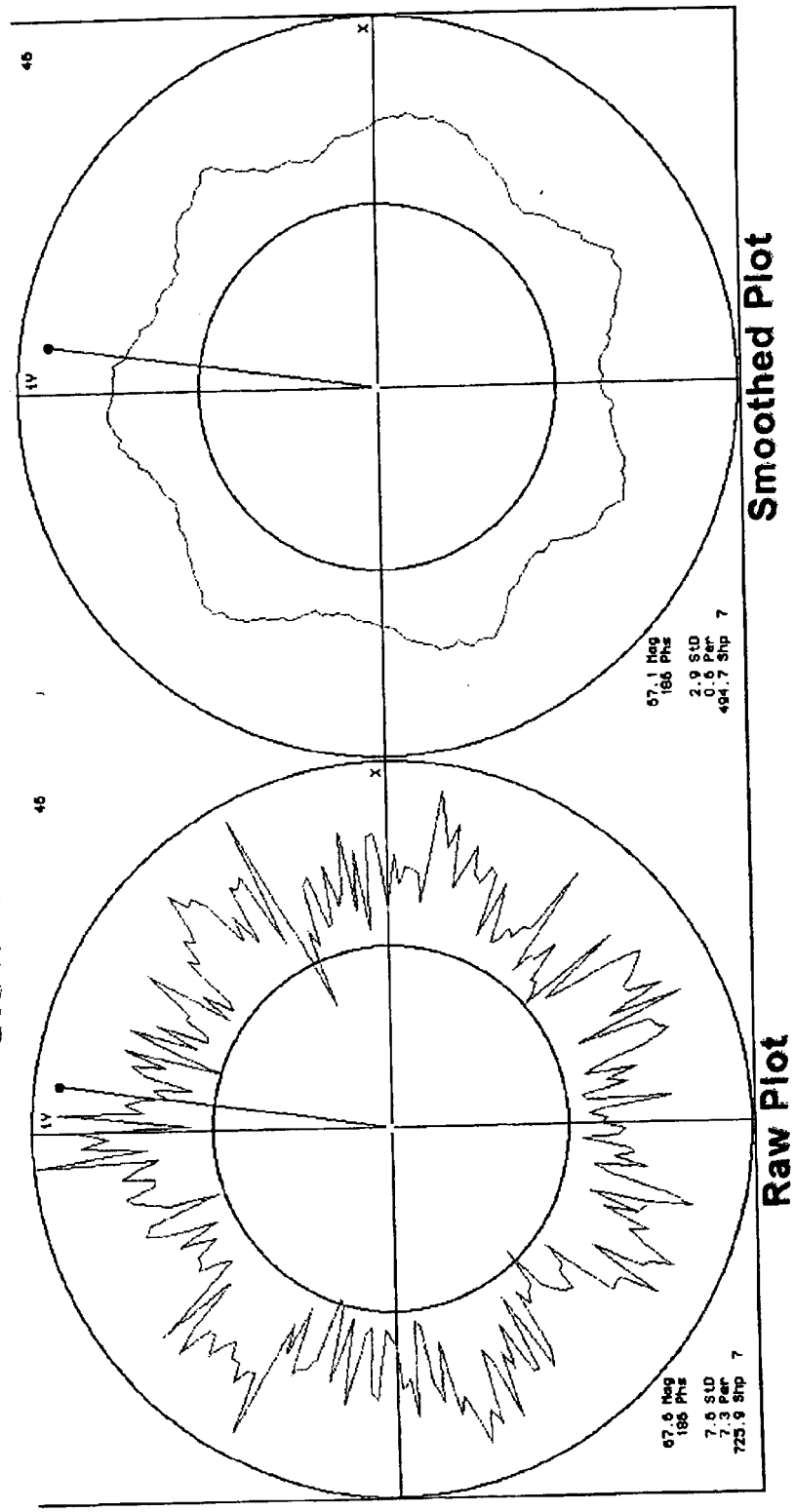
Figure 37:
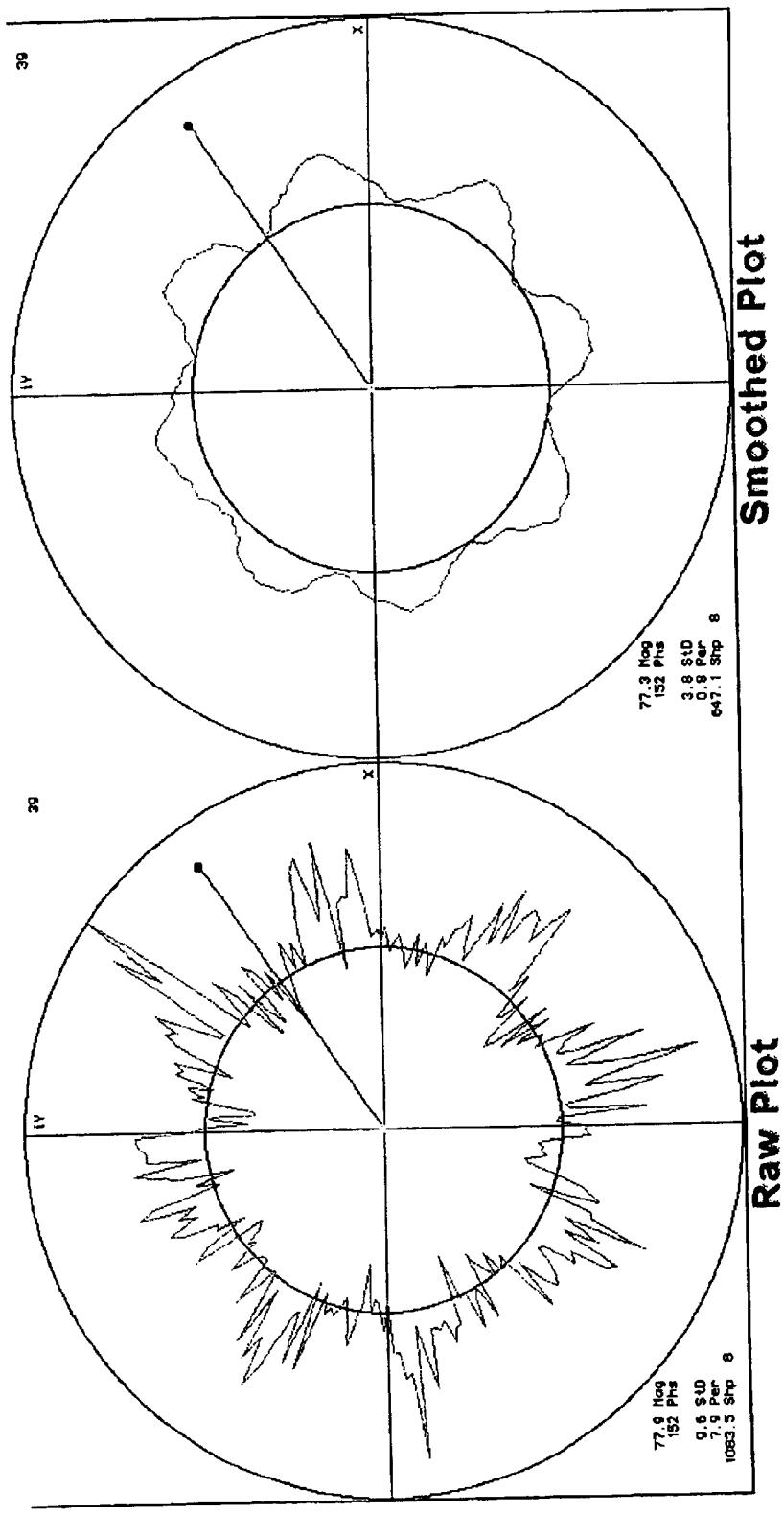
Figure 38:
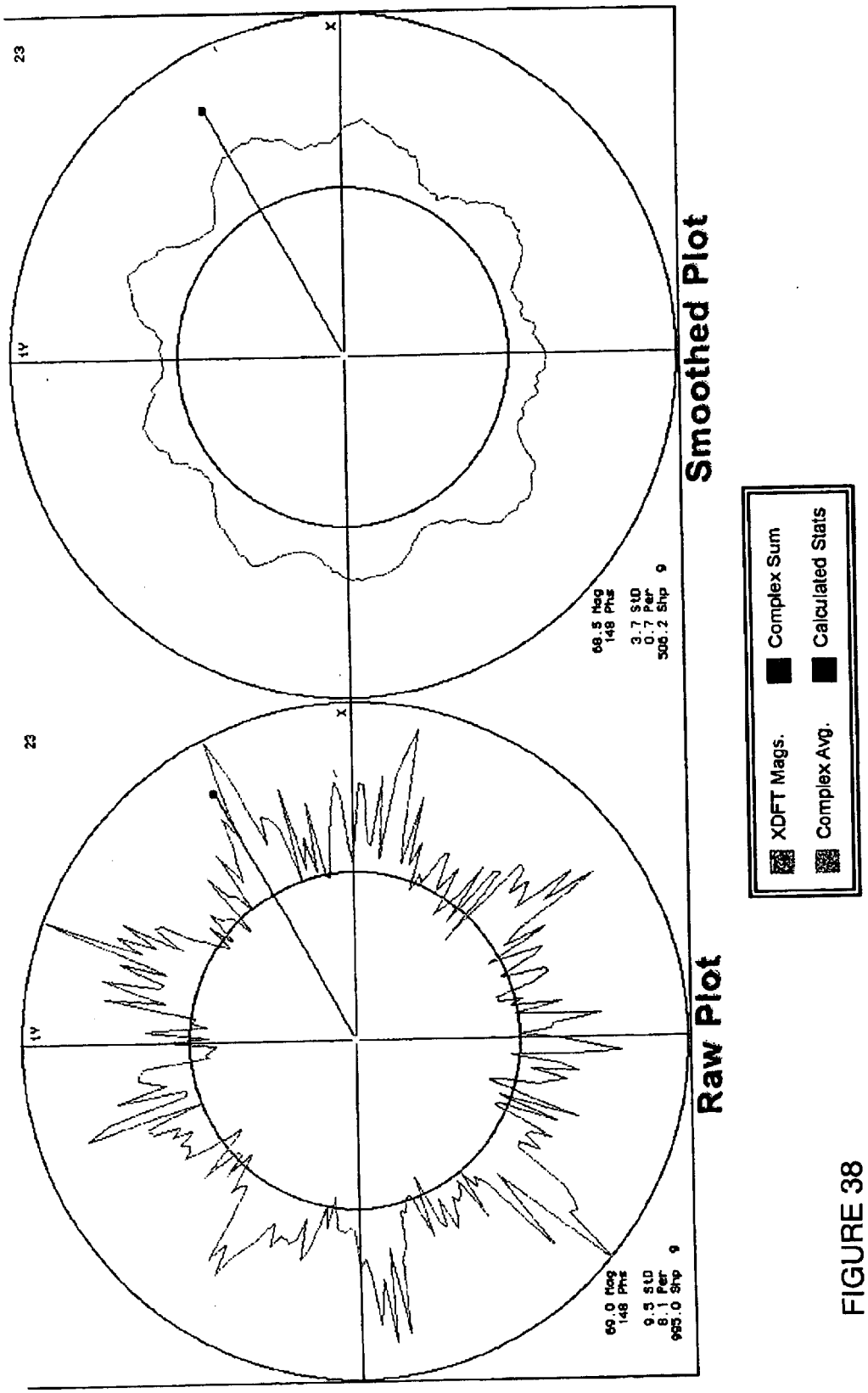
Figure 39:
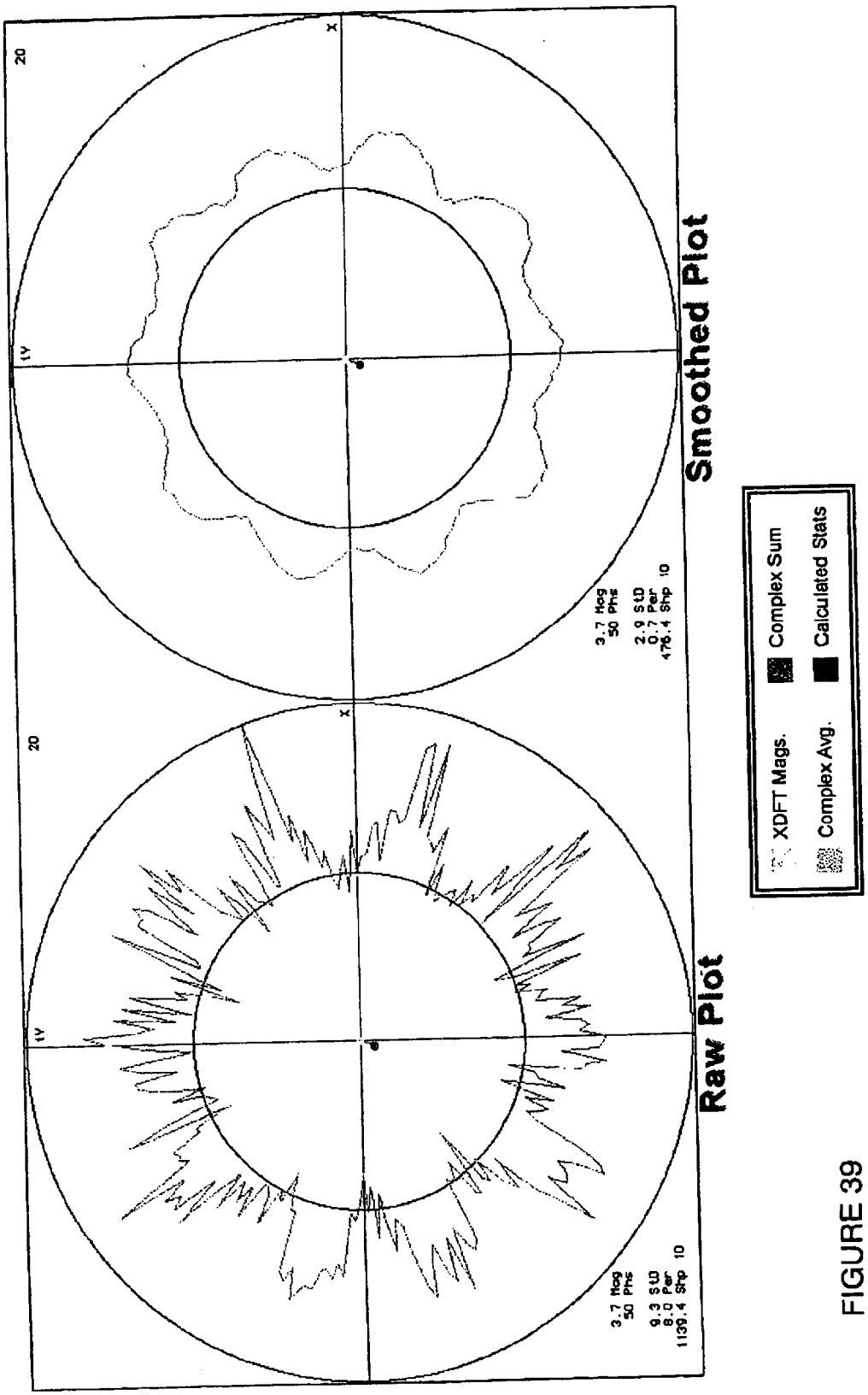

In the images below the phase history data in FIG. 12 (see also FIG. 13), we see the standard result of the Discrete Fourier Transform on this 360 degree signal data. These images were formed by taking a DFT or FFT of the phase history above. The magnitude is on the far right, the phase is in the middle, and the dB-scaled magnitude image is on the left. Notice how the phase of the image is very different from that of the phase history (much finer in detail, but still very structured). Because 360 degrees of data were used, we see a complete outline of the entire object in the image, rather than reflections from illuminating only one side.

In the dB-scaled image of the cone sphere test case, we can clearly see the shape of the cone sphere, but we also see strong responses near the tip and a circle going around it. These responses have actually been artificially enhanced by a factor of 10; they are parts of a "traveling wave" which occurs when the object is illuminated from the rounded side. Some of the energy attaches itself to the side and travels down the edge to the tip, where it interacts with energy coming from the other side and thus appears to be behind and to the side of the tip. The circle is a weaker part of this traveling wave response. Other strong responses occur along the sides of the cone sphere, since they are illuminated directly by the radar. This dataset was chosen to see if the enhanced traveling wave response would cause specific types of patterns to appear in the XDFT results.

In the canoe test case, a Ku-band "waveguide" was added to the top of the object to create a resonant response. There is a direct return from the front of the waveguide and a secondary internal bounce, which shows up as an arc.

The procedure to obtain the output results of the XDFT experiment involved the following steps:
1. Computing the transform
2. Analyzing the resulting plots for each point
3. Deriving parameters or statistics to display important features of the plots
4. Generating parametric images based on these measures to compare to the standard DFT images.

These steps are outlined in FIG. 1.

For each point in the output image, the XDFT generation program has to create the frequency kernel (phase ramp) which corresponds to that point. This ramp is applied to every point in the phase history data, rotating the phase of each input vector by different amounts. Since all of the phases and rotations are calculated modulo 256, the resulting phases are all from 0–255. The program directly adds together all of the magnitudes which land at the same phase, and after all phase history points have been visited, a file composed of 256 magnitudes, one for each phase, is created for the given image domain point. If these magnitudes and phases are added, the result will be the complex sum, which is the standard DFT output.

Instead of adding these values together, however, we plot all 256 of them on the complex plane as a polygon. We compute both raw plots and plots where the magnitudes are smoothed, by averaging neighboring values (±8 usually— the smoothing operations made it easier to see and automatically classify the basic shape of each plot). We then analyze the plots, to see what features they have, and determined what calculations could be performed to detect these features. After coming up with several of these, programs were written to calculate them and to produce parametric images based on each, which could be compared to the DFT image outputs.

Based on these comparisons it could be decided whether the XDFT was providing additional, independent information, beyond that provided by the normal DFT, and whether the XDFT could provide cleaner images, with less noise and fewer artifacts, than the DFT. Each pixel was also classified using these parametric features, to decide whether it had a distinct shape or not, and if so, what type. Classifications for the points determined to be of interest were placed in text files.

Simply viewing the plots can tell us whether the XDFT calculation provides more information than the standard DFT. But there was still one key question which needed to be answered by a control experiment, namely, whether the shape patterns seen in the XDFT plots are somehow created directly by the spatial frequency kernel being applied in each case, or whether these shapes are part of the phase history data itself. To answer this, a control experiment was devised in which each frequency kernel would be applied to a phase history dataset having zero phase throughout, and constant magnitude of one (the identity), so that the effects of the kernels could be considered directly (FIGS. 16-21).

The results are divided into four subsections: XDFT Data Plots, Control Experiment (Kernel) Plots, Point Classifications, and Parametric Images.

Examples of many of the different types of plot shapes that appear in the XDFT data are shown in FIGS. 22 through 39. These are given in order of the shape classification, which can be found at the bottom of each plot, to the right of the letters "Shp" and the decimal representing the shape score. The two plots that are classified as "0's" are random, noisy circles, which have no defined shape. There are also significantly offset shapes that are classified as "1's," as well as oval shapes, three and four-pointed/sided shapes, up to 12-pointed/sided.

Corresponding to the above XDFT plots are a set of kernel plots (FIGS. 16-21), showing the direct effect of the frequency kernel used in each case (raw and smoothed), when applied to an identity phase history (0 phase, 1 magnitude). These plots fall into one of only a few categories, depending on the extent to which the row and column numbers are divisible by two.

A set of rules was devised to classify pixels that could be considered to have a "distinctive" shape. These rules were based on the results of manual observations made of the plots of the first 10 rows of the image, along with some of the more distinctive rows near the middle of the image. The rules selected for the cone sphere test case, for example, were the following:

A raw plot with a shape score of <400 was considered to not have a distinct shape, and was classified as a 0 (noisy circle).

A smoothed plot with a shape score of <300 was considered also to have no distinct shape, and was labeled as a 0.

If the standard deviation of the smoothed plot was >3.0, the plot was considered to be "pointed" (star-shaped); otherwise it was classified as "sided" (polygon shape).

A plot or image point was considered distinctive if it had either a non-zero raw or smoothed plot shape; if so, it was written to a text file along with its classification; otherwise, it would be ignored.

Similar rules, but with different thresholds, were used in the other cases.

It was noted that the shape values for the raw and smoothed plots were not always the same; sometimes these two views of the same data, at different scales, would actually have different shapes. For example, in one case a plot classified as a seven in raw form, was a 3 after smoothing, and both of these answers appeared to be correct. In some cases, a shape would be classified as a 1 after smoothing (slightly offset) even though it had more sides or points in raw form of the plot. Sometimes the raw shape did not meet the minimum threshold, while the smoothed shape did, or vice versa.

Parametric images are shown in FIGS. 14 and 15. There are four pairs (raw and smoothed), one for the shape magnitude scores, one for the shape classes, a third for the raw and smoothed perimeters, and a fourth for the standard deviations. These images were compared to the images of the standard DFT.

The XDFT plots shown illustrate the wide variety of fairly "organized" shapes, which appear at various locations within the XDFT result. By comparing these shapes to their associated complex sums or averages (in red and blue, respectively), it is clear that there is no direct correlation between the patterns found in the XDFT and the DFT complex sum value.

It is evident from the kernel plots of the control experiment, when compared to the corresponding XDFT plots based on the test data, that the kernels themselves are in no way responsible for the patterns we see in the XDFT plot the patterns we see are intrinsic to the data itself, in interaction with the kernel. The kernels produce very uniform patterns in the XDFT plots, even though they differ in terms of the order of visitation of each phase value (which is determined by the frequency, or rotation speed).

The first pair of parametric images (FIG. 14A) were the raw and smoothed shape classes, from 0 (no shape or noisy circle) to a maximum of 12. These images are similar in some respects to the shape magnitude images (see below), but differ in the details; both are clearly different from the DFT images. In particular, the bright structures in the previous images show up here as dark, because most of these points have low shape values. In these shape images, the dominant response seems to "organize"what occurs in most of the rest of the image.

The second pair of parametric images (FIG. 14B) shown are the raw and smoothed shape magnitudes. These were the Fourier shape scores described earlier. The two results are similar yet differ in some respects. The smoothed one appears cleaner and shows structures that are more distinctive in the background. Both differ significantly from the DFT magnitude and dB magnitude results, except in the area of the brightest structures.

The third set of parametric images (FIG. 14C) were the raw and smoothed perimeters, while the raw perimeter appears to be completely random (the raw plots have fairly random borders), the smoothed plot perimeter image shows some of the same structures which we saw in the previous images.

The final pair of parametric images (FIG. 14D) are the raw and smoothed standard deviation images. The raw case has a noisy, almost spiderweb-like texture in the background, much like the smoothed perimeter image, but the smoothed case is much better, having a cleaner background, as well as fine lines around the cone sphere and canoe surfaces. Like the XDFT plots, these parametric images clearly show that the information being obtained through the XDFT plot analyses is different from, and independent of, the results provided by the complex sum of the standard DFT.

The results for the large-scale smoothing and complex sum parametric image were barely different from the original DFT magnitude and dB magnitude images. But, since the surface of the raw XDFT plots is very noisy on all sides, smoothing this noise will make a nicer boundary, although it won't change the complex sum by very much, since the changes created by the smoothing are evenly distributed on all sides, and will tend to cancel each other out. There may be other parameters or other ways of using the existing parameters to produce cleaner radar images; it also seems that the smoothed standard deviation parametric image is cleaner.

The XDFT provides new information about points in the image, independent of the standard DFT result, and not directly determined by the frequency being applied, as shown by the results of the XDFT plots, the parametric images, and the results of the control experiment, which demonstrated that the effect of the frequency kernel did not directly determine the shape of each XDFT plot.

One of the parametric image types ("Smoothed Standard Deviation") seems to provide some indication of improved quality, compared to the DFT images. The use of more powerful computing resources, such as parallel supercomputers, could make it possible to do a larger-scale investigation of the XDFT approach, as well as its practical utility for many problem domains which currently use the DFT. In addition, there are still more detailed analyses that could be carried out on just the parameters as defined herein, and there are other types of parameters that could be defined, such as other statistics, or other shape calculations.

This example referred to 2-dimensional images, but the technique should not be limited by this example, as it may be applied in some form to other dimensional data.

Example 8

In this example, software optimization was performed to obtain faster processing of the XDFT processing. The organization of the calculation was designed to minimize disk I/O, perform all calculations in RAM, and thereby reduce the running times.

In the case of the XDFT and a 256×256-element signal and image, when the phase of an input point is rotated (modulo 256) by a given spatial frequency kernel or phase ramp, corresponding to a particular image point, we determine where it lands in terms of the 256 individual phases, and then add its magnitude to that phase bin. We continue in the same way for all of the points in the phase history (input data). At the end of this process, we have magnitude sums in each of the 256 bins. This is illustrated in the following code snippet, where x and y are dimensions of the phase history data, r and c are the row and column of the FT point being calculated, phmag is the magnitude of the [x,y] phase history (signal) point, imgphs is the kernel-rotated, modular phase, and phsmags is the array used to accumulate the rotated magnitudes in the 256 phase bins of the XDFT:

```
for (int y = 0; y < 256; y++) {
    for (int x = 0; x < 256; x++) {
        if (phmag[y][x] > pow(10,-6)) {  /* Ignore if near 0.0 */
            imgphase = (y * r + x * c) % 256;
            phsmags[imgphase] += phmag[y][x];
}}}
```

Figure 40:
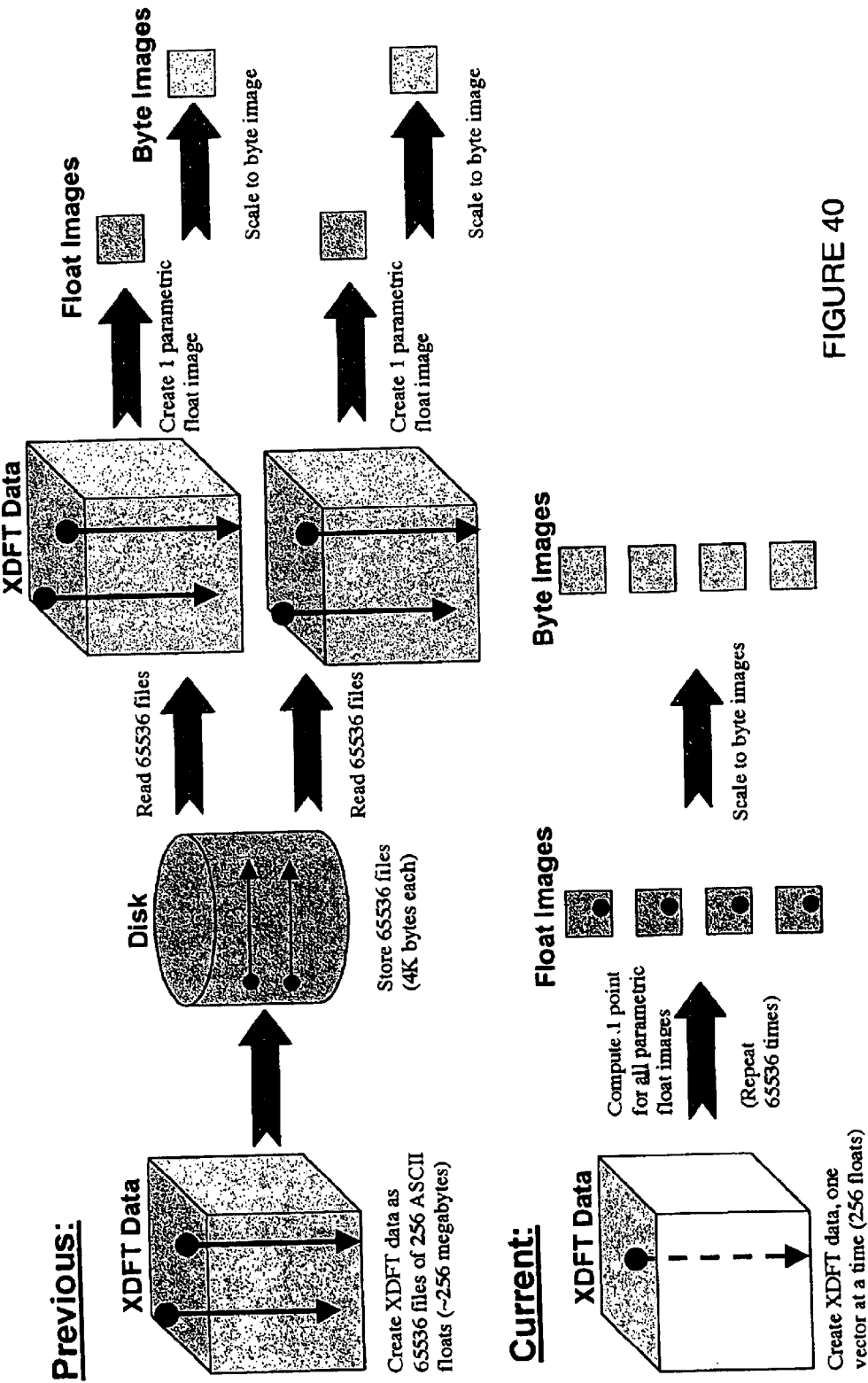
FIG. 40 shows a schematic of computation methods.

When these values are converted to complex numbers and added, the sum will exactly equal the value of the complex DFT at that image point. However, instead of adding these values directly, we plot the magnitude values at each of the 256 discrete phases, and then analyze the characteristics of this plot. The information in the plots—the statistics and the parameters that can be derived from each of them—provides the additional information about each image point, beyond the simple complex sum given by the standard DFT. By calculating such parameters on each plot that is associated with every single point in the image domain, we can create parametric images that display this information, as illustrated in FIGS. 1 and 40.

The entire computational process proceeds one point at a time. The XDFT plot values (256 phase bins of magnitude sums) are generated for a single output point by applying its associated frequency kernel to the input data and adding in each magnitude to the phase bin where it "lands". Given these 256 resulting phase bin values, the parametric values for this same point can be calculated for all of the parametric images, and placed in RAM, in one of 90 float image arrays.

Because the XDFT plot data is calculated on-the-fly, and not saved to disk, there is no disk I/O incurred, and everything happens in RAM, resulting in a much faster program. After all points are calculated, the float output arrays are each scaled and written out as byte images (180×65535 bytes each, about 11 Megabytes total, for 180 images).

The XDFT generation program (GenXDFT) generated the Extended Discrete Fourier Transform by calculating, for each of 256×256 image domain points, an array of 256 magnitude sums, one slot for each phase value. To generate the XDFT result for any given image domain point, this program had to compute the frequency kernel associated with that image point, apply it to the phase of every point in the phase history file, determine the resulting discrete phase values, and add the corresponding magnitude into the corresponding phase bin. At the end of this process, the parametric evaluation functions were called, and their output values written into RAM. This process was repeated 65536 times, one for each image domain point, for a total of more than 4 billion Fourier transform operations, and 180 byte image output files, taking up 65536 bytes of disk space each.

The "Display Plots" program, used for live demonstration of the XDFT algorithm, was written entirely in the MacOS Toolbox. When the program opens, it initializes its memory space, creates and updates the menubar, and opens the necessary windows. After this, it reads in the selected complex signal data file, splits it into magnitude and phase arrays, and begins the 256×256 XDFT loop. For each point in the XDFT loop the program calculates the magnitude sum array, evaluates the parametric calculations, plots the array (along with its complex sum and other information), and draws a scaled value for the parametric calculations on the screen.

This dynamic creation of the output XDFT images clearly demonstrates the feasibility of the XDFT for real-time imaging and other scientific calculations currently dominated by the FFT. Benchmarks indicate that direct use of the MacOS Toolbox increased calculation speed by a factor of two (even while displaying plots on the screen). This is probably because, unlike the C/C++ version which was compiled to run with an interactive console present, the Mac Toolbox routine runs as a non-interruptible standalone application. Further code optimization (conversion to assembly, use of pointers, etc.) could yield a tremendously fast XDFT, that might operate in minutes or seconds for small images like those used here.

A total of 15 different statistics or parameters were selected to apply to the XDFT plot data for each image point. Each statistic was calculated and returned both in linear and in log-scaled form. Beyond this, for each parametric calculation on the XDFT values, 6 different smoothings (linear averages) were analyzed, with smoothing neighborhood widths of 0, +−8, +−16, +−32, +−64, and +−128. The 15 parametric calculations defined were:

Magnitude of complex sum
Phase of complex sum
Intensity (magnitude of complex sum, squared)
Square Root (of magnitude of complex sum)
Perimeter of XDFT plot
Shape of XDFT plot (calculated with Fourier Descriptors)
Magnitude of Fourier Descriptor for Shape value (Shape Score)
Minimum of magnitude sums (over all phase bins)
Maximum of magnitude sums
$75^{th}$ percentile of magnitude sums
$50^{th}$ percentile of magnitude sums (median)
$25^{th}$ percentile of magnitude sums Mean of magnitude sums
Standard deviation of magnitude sums
Root Mean Square (RMS) of magnitude sums The magnitude and phase of the complex sum are the most obvious calculations to perform on the XDFT plot data; these correspond exactly to the complex result of the DFT or FFT (usually only the magnitude is used for image display purposes). To obtain these values, first the complex sum is calculated (for a given image domain point, [r,c]):

```
cplxsum.real = 0.0f;
cplxsum.imag = 0.0f;    /* cplxsum is a struct of type Complex */
phase_i = -π;    /* Start Angle in radians */
for (int phs = 0; phs < 256; phs++) {
    cplxsum.real += magsum[phs] * cos(phase_i); // x axis values
    cplxsum.imag += magsum[phs] * sin(phase_i); // y axis values
    phase_i += 2π/ 256; /* Increment all the way to +π */
}
```

After this, obtaining the magnitude and phase is simple:
MagImg[r,c]=mag(cplxsum.real, cplxsum.imag);
PhsImg[r,c]=phase(cplxsum.real, cplxsum.imag);

The intensity and square root calculations are simply scaling functions of the magnitude complex sum, just described. The Intensity value is obtained by squaring the magnitude of the complex sum, while the square root value is obtained by taking the square root of the magnitude of the complex sum (which is always greater than or equal to zero).

The perimeter is calculated as the sum of the absolute differences between adjacent magnitudes (measured in terms of plot coordinates), plus 1 (a perfect circle would thus have a value of 256). These values are then divided by 256 to give an average deviation between adjacent phases, which would have values with ranges similar to standard deviation values. This parameter seems to be related to the texture of the plot—whether it goes up and down rapidly, (fine texture) or more in groups (coarse texture). Larger perimeters appeared to correspond to finer textures, since the values were changing more rapidly. (I had also tried to measure this feature of the plots by counting the number of times the values crossed the average, or mean, magnitude value, but the perimeter calculation worked better).

First, the overall difference between successive magnitude values is calculated:

```
perimmag = abs(phsmags[nphases - 1] - phsmags[0]);
for (int i = 0; i < 255; i++) {
    perimmag += abs(phsmags[i] - phsmags[i + 1]);
}
```

The variable perimmag is the perimeter, which is divided by 256 before being returned.

One of the most important characteristics of the XDFT plots are their shapes. While many of them simply look like random, noisy circles, others have very distinct shapes, such as polygons or stars, with 2, 3, 4, 5 or more sides or points. To try to classify them accurately using their shape "numbers," another Fourier-type calculation was used, known as "Fourier shape descriptors." To do this, we took the 256 phase and magnitude vectors of an XDFT plot (raw or smoothed), rotated these phases by different rates or frequencies (1 to 12 for objects with 1–12 shapes or sides), and then added the rotated complex results, just as with the DFT, to obtain a complex value and its resulting magnitude.

The effect of rotating these complex vectors by a certain rate, F, is to basically stretch the data around the circle F times. If the shape really has F points or sides, then when the data is stretched in this manner, the peaks will coincide, adding up to a larger complex value, because there is more "weight" in one direction. After doing this for all 12 shape classes or frequencies, we then chose the one having the maximum complex sum as the shape class for that plot. This maximum sum was kept as a "shape score," which could be plotted as another parameter for both the raw and smoothed plots. To "throw out" those plots which had no distinct shape (the noisy circles), a minimum threshold was set on the shape score, so that plots with a lower value would be given a shape class of 0 (the null shape).

```
maxshapemag = 0.0f;
maxshape1 = 0.0f;
for (int s = 0; s < 12; s++) { /* Zero struct complex array */
    shapes[s].real = 0.0f;
    shapes[s].imag = 0.0f;
}
for (int p = 0; p < nphases; p++) {   // Calculates the complex sums
    for (int s = 0; s < 12; s++) {    // of the new plots
        phase_i = (((s+1) * p) % nphases) / (nphases/2)
            * (twopi / 2) - (twopi / 2);
        shapes[s].real += phsmags[p] * cos(phase_i);
        shapes[s].imag += phsmags[p] * sin(phase_i);
}}
for (int s = 0; s < 12; s++) { /* Decides the correct shape */
    if (mag(shapes[s].real, shapes[s].imag) > maxshapemag) {
        maxshape1 = s + 1;
        maxshapemag = mag(shapes[s].real, shapes[s].imag);
}}
if (maxshapemag < 280) { /* Circle = 0 */
    maxshape1 = 0; }
/* If the signal isn't strong enough, make it a circle */
```

The shape is simply maxshape1, and the shape magnitude is maxshapemag.

The minimum and maximum values are calculated for the 256 magnitude sum values (one for each phase bin), simply as follows:

```
minmag = 10000000.0f
for (int phs = 0; phs < nphases; phs++) {
    if (phsmags[phs] < minmag) {
        minmag = phsmags[phs]
}}
maxmag = 0.0f
for (int phs = 0; phs < nphases; phs++) {
    if (phsmags[phs] > maxmag) {
        maxmag = phsmags[phs]
}}
```

The median and other percentiles (e.g. $75^{th}$, $50^{th}$, and $25^{th}$ percentiles) of the magnitude sums are more time consuming to calculate, since they require first sorting the 256 phsmag values.

```
for (int x = 0; x < nphases; x++) {
    sortedarray[x] = phsmags[x];    /* Copy phsmags vector */
}
sort( sortedarray );    // Call to sort (in place)
```

To get the $75^{th}$, $50^{th}$, and $25^{th}$ percentile, I simply ask for the necessary element of the sortedarray –191, 127, and 63, respectively.

The mean of the magnitude sums is calculated by:

```
meanmag = 0.0f;
for (int i = 0; i < nphases; i++) {
    meanmag += phsmags[i]; }
meanmag /= nphases;
```

The standard deviation calculation for the raw or smoothed magnitude sums is also reasonably simple. This number was much larger (especially in the smoothed plots), for shapes that were pointed (star-like) instead of sided (polygon-like), so this seemed a good measure to distinguish this trait. Assuming that we already have the mean magnitude, as calculated above, the standard deviation is as follows:

```
stdevmag = 0.0f;
for (int i = 0; i < nphases; i++) {
    stdevmag += pow((phsmags[i] – meanmag), 2); }
stdevmag /= nphases;
stdevmag = sqrt( stdevmag );
```

The calculation for the Root Mean Square, or RMS, is very similar, except that stdevmag is calculated without subtracting off meanmag (or, using a meanmag of 0.0). The standard deviation measures the variability in the distribution of the magnitude sums, while the RMS measures the extent to which distribution is composed of large values, or is more homogeneous.

The following method was adopted in a following example (Example 9).

Computing the XDFT transform for each image domain point

Calculating 5 smoothed versions of this data (linear averages of different lengths)

Calculating parameters or statistics on the data for each image domain point, to display important features of the plots Generating scaled parametric images based on these measures to compare to the standard DFT images, and to each other Maintaining timing data to confirm speed-ups due to rewriting and reorganization of the program code Analyzing the output image results, in terms of studying the effects of smoothing on individual parameters, comparing the different parametric results to each other and to the DFT image results, and comparing the results obtained for different types of data (medical MR versus SAR)

These steps are depicted graphically in FIG. 1.

The XDFT program produces images at a rate of one every 33 seconds (for a 256×256 data set). While these results were even better than expected, the current code is far from completely optimized-pointers are used very infrequently and the SIOUX console libraries, which provide the user interface framework to the running program, claim processing time (by updating the display and monitoring the system). In addition, if written in assembly language, this transform might be sped up by another factor of one hundred or more.

Example 9

Figure 11:
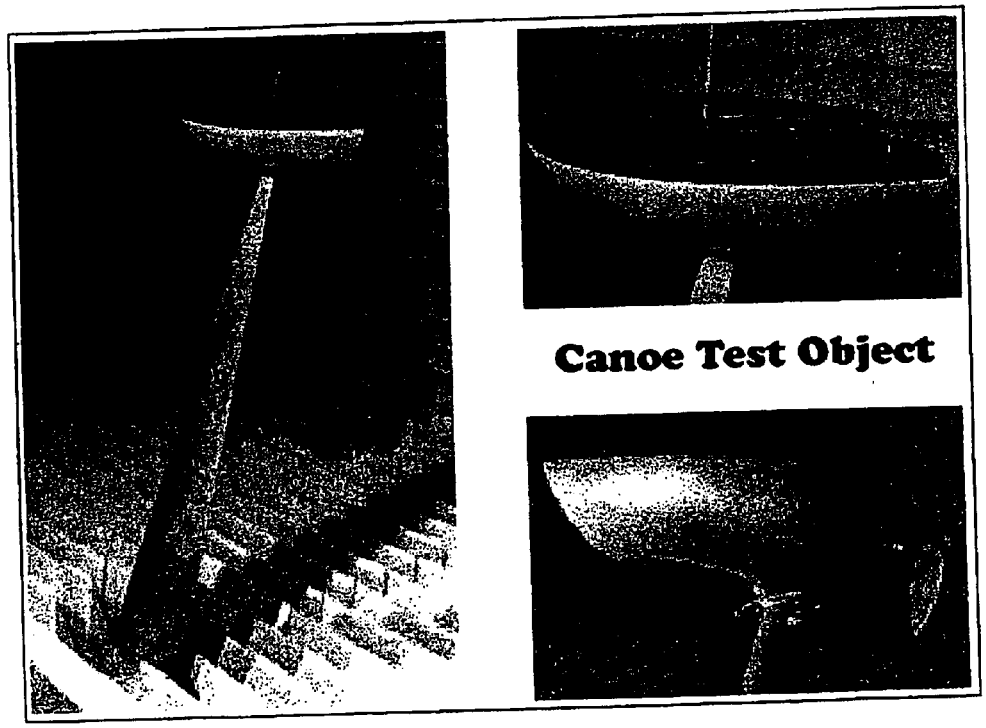
FIG. 11 shows the canoe test object.

The methods described in Example 8 were applied to synthetic aperture radar (SAR) and magnetic resonance imaging (MRI) data obtained from different laboratories. Four radar datasets, two each of a cone sphere object and canoe-shaped test body, were obtained from Veridian ERIM International (ERIM). Three MRI datasets were obtained from the University of Michigan. Finally, the University of Chicago contributed a magnetic resonance angiography dataset Additional complex signal phase history radar data (256× 256, polar plotted) were obtained, both a test and a reference case, for a canoe-shaped radar test object (FIG. 11). These were obtained from a local company (ERIM) that specializes in radar measurements. This data was collected in their indoor diagnostic radar measurement chamber, and was in addition to the cone sphere radar data sets described in Example 7.

Figure 10:
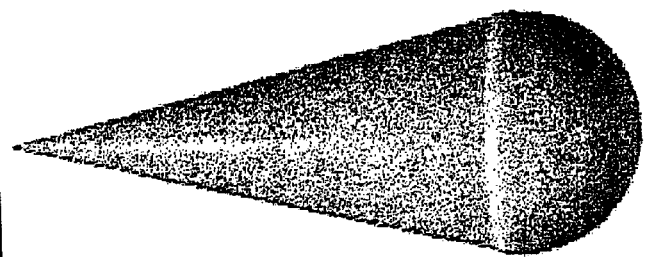
FIG. 10 shows the cone sphere test object.

The four sets of synthetic aperture radar (SAR) data consist of a reference and test or altered case for each of two objects: a metal cone sphere, and a metal canoe object, both less than two feet in length [see FIGS. 10 and 11]. The cone sphere is an ideal and radially symmetric combination of a cone and a sphere, simple enough for its radar response to be predicted mathematically, which is why it is often used as a test object. Because of its smooth, rounded surfaces (except at the tip) it reflects most of the radar energy away. The canoe shape also reflects most of the radar energy away, but was built so that small items could be attached to the top surface, to study their specific radar scattering behavior.

Both objects were measured in a special, anechoic, diagnostic radar chamber, used by ERIM for carrying out radar measurement studies under ideal conditions. In the chamber, the object is placed on a pylon and slowly rotated, while the radar fires "frequency sweeps" at it, recording the echoed responses.

In the case of the cone sphere test data, the data was collected using X-band (8–12 Gigahertz frequencies) and Ku-band (12–18 GHz), with horizontal transmit and receive polarizations (HH). This frequency range corresponds to wavelengths of a few centimeters (10 Ghz=3 cm wavelength). The canoe example was measured at Ku-band only, using vertical transmit and receive polarizations (VV).

A full 360 degrees of data was collected, remapped to a donut or ring, and embedded within a square of complex zeros. Because radar data often has a very wide range (over several orders of magnitude), a dB or logarithmic scale is often preferred to the linear scale, to bring out more details in the magnitude signal or image representation. (Unfortunately, this also enhances the noise, sidelobes, and any other artifacts.)

For these two objects, the patterns present in the reference phase history magnitude and phase are fairly simple and well-behaved, again because they were collected under ideal conditions. This was seen in the normal image displays for the reference, based on the DFT magnitudes. The phase of the image data was very different from that of the phase history or signal (i.e., much finer in detail, but still very structured). Because 360 degrees of data were used, a complete outline of the entire object in the image was observed, rather than reflections from illuminating only one side.

For the cone sphere test case, a "traveling wave" response near the tip has been artificially enhanced, causing the stronger response here. This response was actually artificially enhanced by a factor of 10; it occurs when the object is illuminated from the rounded side. Some of the energy attaches itself to the side and travels down the edge to the tip, where it interacts with energy coming from the other side and thus appears to be behind and to the side of the tip. Other strong responses occur along the sides of the cone sphere, since they are illuminated directly by the radar. This dataset was chosen to see if the enhanced traveling wave response would cause specific types of patterns or shapes to appear in the XDFT results.

In the canoe test case, a Ku-band "waveguide" was added to the top of the object to create a resonant response. This appears as a direct return from the front of the waveguide plus a secondary internal bounce, which shows up as an arc in the DFT magnitude image. Complex signal phase history data (256×256 or 192×256, then zero-padded) were also acquired, for four magnetic resonance images. Three sets of controlled "phantom data" were obtained from the University of Michigan, and one brain scan MR angiography set was obtained from the University of Chicago.

For the medical imagery, three phantom magnetic resonance (MR) imaging data sets were initially obtained from the University of Michigan. In all three data sets, a silicon based phantom containing three X-shaped objects was imaged. In the first set, "expl," the objects were imaged in a plane parallel to the X's. This yields one of two results: either one of the X's or the space in between. In the second and third sets, "exp3"and "exp4," the objects were imaged perpendicular to the plane of the X's, yielding a top view of the three rectangular-shaped objects.

The fourth MR data set, obtained from the University of Chicago, was an example of magnetic resonance angiography (blood flow analysis), using a "time-of-flight" MR technique, which is based on the fact that flowing tissue (blood) which is initially excited by the magnetic pulse, will move through an imaging slice during the subsequent relaxation periods, while stationary tissue will not. The signal strength depends on a number of factors, including the slice thickness, the flow volume and velocity, and the MR relaxation time parameters.

Complex signal data (magnitude and phase) for these four MR data were collected using a linear scanning device, and so the signal data fills the aperture (except possibly for zero padding on either side). Standard complex DFT image results (magnitude and phase) for these four data were obtained.

For each of the parametric image calculations, the XDFT plot data for each image domain point was smoothed by neighborhoods of ±8, ±16, ±32, ±64, and ±128 (which encompasses all of the 256 bins, plus the center bin counted one additional time). The effects of different levels of smoothing (including none) on a number of different parametric calculations for the MR brain scan data sets were investigated.

The smoothing of the 256 data points in the XDFT plot for one image point definitely produces a cleaner, less noisy plot, for which the basic shape was easier to see. It was not clear however, what the effect of this would be on the parametric image as a whole, because these smoothings are taking place internal to each image point—the neighborhoods are not being applied to different pixels in the image domain. In fact, while an averaging filter like the ones use here, would tend to blur the details of an image if applied to a neighborhood in the image domain, when applied to the XDFT plots, it actually makes the images cleaner and make it easier to see the main objects. As we increased the smoothing neighborhood size from 8 to 16 to 32 to 64, the image became increasingly clear for many of the parametric calculations.

One of the nice features of the XDFT is its ability to produce new images as well as those produced by the regular DFT. The Complex Sum (magnitude) image is the most common output of the DFT, although sometimes the Phase image is also output, depending on what information is needed about the target object. The intensity image presents a drastically different perspective of the image, cutting off the lower values, and more clearly showing the brighter spots. The square root image, however, does the opposite—it brightens the lower points significantly, showing the user more details of what is actually going on in the lower levels of the image.

The perimeter images are mostly random, with lines streaking across at odd angles, or ordered sets of repeating points. Like the $25^{th}$–$75^{th}$ percentile images, these may contain some data related to the imaging techniques used, or other information.

The shape images do an excellent job of representing the basic shape of the object imaged, and provide a result which is distinctly different than most of the other calculations. Unfortunately, it completely ignores the brighter points, making it unsatisfactory in some ways. In contrast, the shape magnitude images produced clear interpretations of the brighter points, and retained information concerning the lesser points, making it a viable calculation. Both sets of images became progressively clearer at higher smoothing values.

The maximum images were much like the $25^{th}$–$75^{th}$ percentile images, with the exception that the non-0 and non-128 smoothing values contained no reference to the brighter points in the DFT image. The mean images were completely random, and did not change at all between smoothing values (because smoothing is simply adding in more points, then dividing by the number added).

The minimum images were some of the best of all. They clearly present the more important points, but do not throw away the others (Oust makes them much less bright). These images seem to be a clear improvement over the existing DFT images.

The reason the minimum images are so good at representing the data is directly related to the plots. A bright point, one with a large complex sum, will have its plot offset on each side of the origin. Thus, its minimum value will be pushed inward, less than that of a circular plot, since the energy in the circular plot is nearly evenly distributed about the different phase bins.

The $25^{th}$–$75^{th}$ percentile images produced the most unexpected results. At smoothing values of 0 and 128, the images look the same—they have lines running across the image, over a dark background. For the rest of the smoothing values, the image resembles a painted surface, with phase-like points where the major bright pixels in the complex sum image are. The surface seems to become smoother for higher smoothing values. It is possible the lines found in the 0 and 128-smoothed images contain some information related to the techniques used to image the object, or might reveal information concerning the angles at which the objects were imaged.

The Root Mean Squared images are some of the best output images produced by the XDFT. The 0 and 128-smoothed images are often random, but the 64-smoothed image is consistently a clear representation of the objects imaged.

The root mean squared increases with complex sum. This is because points with large complex sums have plots that are offset from the origin—thus the magnitude values for each phase vary considerably. The RMS image traces the important parts of the image (those with larger complex sums), and ignores lesser points whose mild fluctuations in magnitude values may have caused it to show up in the normal DFT image.

The standard deviation calculation is essentially the same as the RMS calculation, except for one small detail—the mean is subtracted from each magnitude before it is squared. This leads to messier images at smoothing values lower than 64. Again, the 64-smoothed image is very good, and, remarkably, resembles the original complex sum image.

The look of the parametric images of the XDFT were compared to different datasets—two pairs of SAR images (reference and test cases for two different objects), three phantom MRI images and one MR angiography image of the brain. The parametric XDFT images had similar effects for each of the different types of datasets. The smoothing effects were similar, and the basic character of each parametric calculation, was for the most part, similar from one image type to another. This suggests that these calculations and parametric images can also be applied to other scientific, medical, and military imaging applications, and we can expect similar results.

Smoothing of the raw XDFT data points had a noticeable effect on the parametric image results. Stronger smoothing of the XDFT plots (using larger averaging neighborhoods), resulted in cleaner images for most parameters, with fewer artifacts.

Certain of the parametric image calculations, notably the Shape image and the Minimum image, provided information which was clearly different from the normal complex DFT magnitude. Others, like the RMS calculation and the Minimum, produced images which appear better, in certain respects, than the DFT image.

Finally, while there were minor variations, the above conclusions about smoothing effects, additional information, and improved image quality held true for all of the four different SAR data sets, as well as the four medical MR data sets. This suggests that the transform may have wider applicability to other fields as well.

The practical applicability of the XDFT is clearly demonstrated, for use in generating various kinds of images from the same elementary steps that are used to carry out the Discrete Fourier Transform, or the FFT. The transform can be calculated within a very reasonable time frame, on the order seconds to minutes per image, depending on the number of images generated.

The different parametric images tell us new things about the data, and may tell us some things, not only about the objects being imaged, but also about the processes or methods used to image them (both in terms of the sensing system and the post-processing steps used).

Various levels of smoothing had various effects on the parametric image data, in terms of bringing out, or clarifying, patterns present in the unsmoothed versions. Because of the nature of this smoothing is "internal" to each image point, rather than being defined over a neighborhood of pixels, it was not clear initially that this smoothing would have this kind of effect at all.

The XDFT can be used to create sharper quality images, has similar effects for data of different types such as synthetic aperture radar and magnetic resonance angiography. This further strengthens the argument that the XDFT has potential significance for many other medical and scientific fields, which use Fourier Transforms to construct images from signals.

What is claimed is:

1. A method of analyzing an input signal containing a plurality of data points, using a Fourier frequency kernel, comprising the steps of:

applying the frequency kernel to the data points;

calculating magnitude data as a function of phase for the data points after the frequency kernel has been applied; and extracting useful information from the input data based upon the result of the above calculation.

2. The method of claim 1, further comprising the steps of:

calculating a parameter from the magnitude data as a function of phase;

calculating the parameters resulting from the application of a plurality of Fourier frequency kernels to the input signal; and forming an image using the parameters from the input signal by Fourier transform analysis.

3. The method of claim 1, further comprising:

manipulating the magnitude data as a function of phase; and forming an image using the manipulated data.

4. The method of claim 3, further including the step of smoothing the magnitude data as a function of phase.

5. An image processing method for images derived from a plurality of data points having magnitude and phase, by Fourier transform analysis, the method comprising the following steps:

applying a Fourier frequency kernel to the data points, transforming the magnitude and phase of each data point;

collection of the transformed magnitude of each data point as a function of transformed phase;

manipulation of the collected transformed magnitude and phases using an algorithm; and combination of the manipulated transformed magnitude and phases into an image point, whereby image processing at the level of a single image point is possible.

* * * * *